United States Patent
Jauh et al.

(10) Patent No.: US 11,979,773 B2
(45) Date of Patent: May 7, 2024

(54) METHOD AND APPARATUS FOR MULTI-LINK DATA TRANSMISSION, AND STORAGE MEDIUM

(71) Applicant: SPREADTRUM COMMUNICATIONS (SHANGHAI) CO., LTD., Shanghai (CN)

(72) Inventors: Yuh-Ren Jauh, Shanghai (CN); Yanchao Xu, Shanghai (CN); Ching-Hwa Yu, Shanghai (CN); Long Wang, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 266 days.

(21) Appl. No.: 17/427,624

(22) PCT Filed: Mar. 27, 2020

(86) PCT No.: PCT/CN2020/081776
§ 371 (c)(1),
(2) Date: Jul. 30, 2021

(87) PCT Pub. No.: WO2020/156591
PCT Pub. Date: Aug. 6, 2020

(65) Prior Publication Data
US 2022/0104071 A1 Mar. 31, 2022

(30) Foreign Application Priority Data
Jan. 30, 2019 (CN) .......................... 201910091729.7

(51) Int. Cl.
*H04W 28/08* (2023.01)
*H04W 28/082* (2023.01)
(Continued)

(52) U.S. Cl.
CPC ..... *H04W 28/0975* (2020.05); *H04W 28/082* (2023.05); *H04W 28/0992* (2020.05);
(Continued)

(58) Field of Classification Search
None
See application file for complete search history.

(56) References Cited

U.S. PATENT DOCUMENTS 9,160,673 B1 * 10/2015 Lang ................... H04L 47/6225
10,492,221 B1 * 11/2019 Chu ...................... E21B 21/08
(Continued)

FOREIGN PATENT DOCUMENTS

CN 101931954 A 12/2010
CN 102368860 A 3/2012
(Continued)

OTHER PUBLICATIONS

Extended European Search Report for EP Application No. 20748700.0, dated Dec. 1, 2022, in 8 pages.
(Continued)

*Primary Examiner* — Adnan Baig
(74) *Attorney, Agent, or Firm* — Knobbe, Martens, Olson & Bear, LLP

(57) ABSTRACT

Provided are a method and an apparatus for multi-link data transmission and a storage medium. The method includes: transmitting real time application (RTA) data over a primary link; and transmitting the RTA data at a high priority in response to a repetition condition being triggered. The apparatus includes: a memory; and at least one processor coupled to the memory and configured to transmit RTA data over a primary link; and transmit the RTA data at a high priority in response to a repetition condition being triggered.

28 Claims, 21 Drawing Sheets

(51) Int. Cl.
*H04W 72/56* (2023.01)
*H04W 28/02* (2009.01)
*H04W 74/0833* (2024.01)
*H04W 84/12* (2009.01)

(52) U.S. Cl.
CPC ........ *H04W 72/56* (2023.01); *H04W 28/0268* (2013.01); *H04W 28/0289* (2013.01); *H04W 74/0833* (2013.01); *H04W 84/12* (2013.01)

(56) References Cited

U.S. PATENT DOCUMENTS

| 2007/0002884 | A1 | 1/2007 | Jaakkola et al. | |
|---|---|---|---|---|
| 2010/0183004 | A1 | 7/2010 | Kobayashi | |
| 2014/0079016 | A1 | 3/2014 | Dai et al. | |
| 2014/0086227 | A1* | 3/2014 | Yang | H04W 72/1263 370/338 |
| 2016/0164638 | A1 | 6/2016 | Seok | |
| 2017/0303314 | A1* | 10/2017 | Cariou | H04W 74/0808 |
| 2018/0270139 | A1 | 9/2018 | Singh | |
| 2018/0310338 | A1* | 10/2018 | Li | H04W 74/0816 |
| 2019/0098606 | A1* | 3/2019 | Sharma | H04B 7/0404 |
| 2019/0322298 | A1* | 10/2019 | Mong | B61L 23/005 |
| 2020/0235862 | A1* | 7/2020 | Di Taranto | H04L 1/1861 |
| 2021/0258830 | A1* | 8/2021 | Baek | H04W 72/569 |
| 2021/0368420 | A1* | 11/2021 | Cavalcanti | H04W 48/16 |

FOREIGN PATENT DOCUMENTS

| CN | 103068054 A | 4/2013 |
|---|---|---|
| CN | 103152287 A | 6/2013 |
| CN | 105591899 A | 5/2016 |
| CN | 108200601 A | 6/2018 |
| CN | 109587052 A | 4/2019 |

OTHER PUBLICATIONS

Office Action for CN 2019100917297.
First Search Report for CN 2019100917297.
International Search Report for PCT/CN2020/081776.
Notice of Allowance of Chinese Application No. 201910091729.7, dated Dec. 13, 2021, in 4 pages.

* cited by examiner

METHOD AND APPARATUS FOR MULTI-LINK DATA TRANSMISSION, AND STORAGE MEDIUM

CROSS-REFERENCE TO RELATED APPLICATIONS

The present application is a US National Phase application of International Application No. PCT/CN2020/081776, filed on Mar. 27, 2020, which claims priority to Chinese Patent Application No. 201910091729.7 filed on Jan. 30, 2019, the disclosure of each of which is incorporated by reference herein in its entirety.

TECHNICAL FIELD

The present disclosure relates to the field of wireless communications, and in particular, to a method and apparatus for multi-link data transmission, and a storage medium.

BACKGROUND

With the development of communication technologies, an average delay of wireless broadband Wi-Fi currently is generally satisfactory, while a satisfactory delay in a worst case still cannot be ensured. The delay in a worst case may be dozens of times the average delay sometimes. As a result, users of some applications such as mobile games, wireless augmented reality (AR) applications, and wireless virtual reality (VR) applications have unpleasant experience.

In a wireless local area network (WLAN), real time application (RTA) delay improvement is a new requirement for mobile games and other related applications. How to control a delay in a worst case has become a problem that needs to be urgently resolved.

SUMMARY

In view of this, the present disclosure proposes a method for multi-link data transmission. The method includes: transmitting RTA data over a primary link; and transmitting the RTA data at a high priority under a condition that a repetition condition is triggered.

In a possible implementation, the transmitting the RTA data at a high priority includes: transmitting the RTA data over a secondary link at the high priority; and/or transmitting the RTA data over the primary link at the high priority.

In a possible implementation, the repetition condition includes: transmission of the RTA data over the primary link is not completed within a time threshold.

In a possible implementation, the repetition condition that the transmission of the RTA data over the primary link is not completed within the time threshold includes: the transmission of the RTA data fails; the primary link is congested due to interference; or the RTA data is congested by a transmission queue system of the primary link.

In a possible implementation, the transmitting the RTA data over a secondary link at the high priority includes: continuing to transmit the RTA data over the primary link; duplicating the RTA data; and transmitting the duplicated RTA data over the secondary link at the high priority by using a transmission opportunity (TXOP) holder.

In a possible implementation, the transmitting the RTA data over the primary link at the high priority includes: transmitting the RTA data over the primary link at the high priority by using a TXOP holder.

In a possible implementation, the transmitting the duplicated RTA data over the secondary link at the high priority by using a TXOP holder includes: transmitting the RTA data at the high priority under a condition that the secondary link is in a channel idle state; or transmitting the RTA data over the secondary link at the high priority under a condition that an RTA data transmitting terminal is consistent with the TXOP holder; or transmitting the RTA data over the secondary link at the high priority under a condition that an RTA data transmitting terminal is inconsistent with the TXOP holder.

In a possible implementation, the transmitting the RTA data over the primary link at the high priority by using a TXOP holder includes: transmitting the RTA data at the high priority under a condition that the primary link is in a channel idle state; or transmitting the RTA data over the primary link at the high priority under a condition that an RTA data transmitting terminal is consistent with the TXOP holder; or transmitting the RTA data over the primary link at the high priority under a condition that an RTA data transmitting terminal is inconsistent with the TXOP holder.

In a possible implementation, the transmitting the RTA data at the high priority under a condition that the secondary link is in a channel idle state includes: adding, by the RTA data transmitting terminal, the RTA data to a waiting list of the secondary link under a condition that the secondary link is in the channel idle state, to immediately transmit the RTA data, or contending, by the RTA data transmitting terminal by using a contention window, for a channel in the secondary link under a condition that the secondary link is in the channel idle state, to transmit the RTA data.

In a possible implementation, the transmitting the RTA data over the secondary link at the high priority under a condition that an RTA data transmitting terminal is consistent with the TXOP holder includes: transmitting, by inserting the RTA data into a current TXOP queue, the RTA data over the secondary link under a condition that the RTA data transmitting terminal is consistent with the TXOP holder.

In a possible implementation, the transmitting the RTA data at the high priority under a condition that the primary link is in a channel idle state includes: adding, by the RTA data transmitting terminal, the RTA data to a waiting list of the primary link under a condition that the primary link is in the channel idle state, to immediately transmit the RTA data; or contending, by the RTA data transmitting terminal by using a contention window, for a channel in the primary link under a condition that the primary link is in the channel idle state, to transmit the RTA data.

In a possible implementation, the transmitting the RTA data over the primary link at the high priority under a condition that an RTA data transmitting terminal is consistent with the TXOP holder includes: transmitting, by inserting the RTA data into a current TXOP queue, the RTA data over the primary link under a condition that the RTA data transmitting terminal is consistent with the TXOP holder.

In a possible implementation, the transmitting the RTA data over the secondary link at the high priority under a condition that an RTA data transmitting terminal is inconsistent with the TXOP holder includes: transmitting the RTA data over the secondary link at the high priority under a condition that the RTA data transmitting terminal is a wireless access point (AP) and the TXOP holder is a wireless access station (STA); or transmitting the RTA data over the secondary link at the high priority under a condition that the RTA data transmitting terminal is an STA and the TXOP holder is an AP; or transmitting the RTA data over the secondary link at the high priority under a condition that the RTA data transmitting terminal and the TXOP holder are different STAs.

In a possible implementation, the transmitting the RTA data over the primary link at the high priority under a condition that an RTA data transmitting terminal is inconsistent with the TXOP holder includes: transmitting the RTA data over the primary link at the high priority under a condition that the RTA data transmitting terminal is a wireless AP and the TXOP holder is a wireless access STA; or transmitting the RTA data over the primary link at the high priority under a condition that the RTA data transmitting terminal is an STA and the TXOP holder is an AP; or transmitting the RTA data over the primary link at the high priority under a condition that the RTA data transmitting terminal and the TXOP holder are different STAs.

In a possible implementation, the transmitting the RTA data over the secondary link at the high priority under a condition that the RTA data transmitting terminal is a wireless AP and the TXOP holder is a wireless access STA includes: taking over, by the AP, a TXOP control right from the STA over the secondary link; transmitting, by the AP, the RTA data over the secondary link by using a TXOP; and returning, by the AP, the TXOP control right to the STA over the secondary link.

In a possible implementation, the transmitting the RTA data over the primary link at the high priority under a condition that the RTA data transmitting terminal is a wireless AP and the TXOP holder is a wireless access STA includes: taking over, by the AP, a TXOP control right from the STA over the primary link; transmitting, by the AP, the RTA data over the primary link by using a TXOP; and returning, by the AP, the TXOP control right to the STA over the primary link.

In a possible implementation, the transmitting the RTA data over the secondary link at the high priority under a condition that the RTA data transmitting terminal is an STA and the TXOP holder is an AP includes: transmitting the RTA data over the secondary link at the high priority under a condition that the RTA data transmitting terminal is an STA, the TXOP holder is an AP, and the STA is a receiving STA corresponding to the AP; or transmitting the RTA data over the secondary link at the high priority under a condition that the RTA data transmitting terminal is an STA, the TXOP holder is an AP, and the STA is not a receiving STA corresponding to the AP.

In a possible implementation, the transmitting the RTA data over the primary link at the high priority under a condition that the RTA data transmitting terminal is an STA and the TXOP holder is an AP includes: transmitting the RTA data over the primary link at the high priority under a condition that the RTA data transmitting terminal is an STA, the TXOP holder is an AP, and the STA is a receiving STA corresponding to the AP; or transmitting the RTA data over the primary link at the high priority under a condition that the RTA data transmitting terminal is an STA, the TXOP holder is an AP, and the STA is not a receiving STA corresponding to the AP.

In a possible implementation, the transmitting the RTA data over the secondary link at the high priority under a condition that the RTA data transmitting terminal is an STA, the TXOP holder is an AP, and the STA is a receiving STA corresponding to the AP includes: transmitting, by the STA, an RTA data transmission request to the AP over the secondary link by using an acknowledgement frame; and transmitting, by the STA, the RTA data over the secondary link with the assistance of the AP.

In a possible implementation, the transmitting the RTA data over the secondary link at the high priority under a condition that the RTA data transmitting terminal is an STA, the TXOP holder is an AP, and the STA is not a receiving STA corresponding to the AP includes: periodically polling, by the AP, a specified STA or a non-specified STA other than the specified STA for an RTA data transmission request by using an uplink orthogonal frequency division multiple access (UL-OFDMA) trigger frame; based on that the STA as the RTA data transmitting terminal is the specified STA, transmitting the RTA data transmission request by using a specified resource unit, or based on that the STA as the RTA data transmitting terminal is the non-specified STA other than the specified STA, transmitting the RTA data transmission request by using a random access resource unit; and transmitting, by the STA as the RTA data transmitting terminal, the RTA data over the secondary link with the assistance of the AP.

In a possible implementation, the transmitting the RTA data over the primary link at the high priority under a condition that the RTA data transmitting terminal is an STA, the TXOP holder is an AP, and the STA is a receiving STA corresponding to the AP includes: transmitting, by the STA, an RTA data transmission request to the AP over the primary link by using an acknowledgement frame; and transmitting, by the STA, the RTA data over the primary link with the assistance of the AP.

In a possible implementation, the transmitting the RTA data over the primary link at the high priority under a condition that the RTA data transmitting terminal is an STA, the TXOP holder is an AP, and the STA is not a receiving STA corresponding to the AP includes: periodically polling, by the AP, a specified STA or a non-specified STA other than the specified STA for an RTA data transmission request by using a UL-OFDMA trigger frame; based on that the STA as the RTA data transmitting terminal is the specified STA, transmitting the RTA data transmission request by using a specified resource unit, or based on that the STA as the RTA data transmitting terminal is the non-specified STA other than the specified STA, transmitting the RTA data transmission request by using a random access resource unit; and transmitting, by the STA as the RTA data transmitting terminal, the RTA data over the primary link with the assistance of the AP.

In a possible implementation, the transmitting the RTA data over the secondary link at the high priority under a condition that the RTA data transmitting terminal and the TXOP holder are different STAs includes: acquiring, by the AP, a temporary TXOP control right from the STA as the TXOP holder, and periodically conducting polling for an RTA data transmission request; transmitting, by the STA as the RTA data transmitting terminal, the RTA data transmission request by using a specified resource unit or a non-specified resource unit other than the specified resource unit; transmitting, by the STA as the RTA data transmitting terminal, the RTA data over the secondary link with the assistance of the AP; and returning, by the AP, the TXOP control right to the STA as the TXOP holder.

In a possible implementation, the transmitting the RTA data over the primary link at the high priority under a condition that the RTA data transmitting terminal and the TXOP holder are different STAs includes: acquiring, by the AP, a temporary TXOP control right from the STA as the TXOP holder, and periodically conducting polling for an RTA data transmission request; transmitting, by the STA as the RTA data transmitting terminal, the RTA data transmission request by using a specified resource unit or a non-specified resource unit other than the specified resource unit; transmitting, by the STA as the RTA data transmitting terminal, the RTA data over the primary link with the assistance of the AP; and returning, by the AP, the TXOP control right to the STA as the TXOP holder.

In a possible implementation, the acquiring, by the AP, a temporary TXOP control right from the STA as the TXOP holder, and periodically conducting polling for an RTA data transmission request includes: acquiring, by the AP, the temporary TXOP control right from the STA as the TXOP holder, and periodically conducting polling for the RTA data transmission request by using a cascading trigger frame, where the cascading trigger frame includes a cascade of an acknowledgement frame and a UL-OFDMA trigger frame, and the cascading trigger frame includes information about a request for the temporary TXOP control right; or acquiring, by the AP, the temporary TXOP control right from the STA as the TXOP holder, and periodically conducting polling for the RTA data transmission request by sequentially using an acknowledgement frame and a UL-OFDMA trigger frame, where the acknowledgement frame includes information about a request for the temporary TXOP control right; or acquiring, by the AP, the temporary TXOP control right by receiving a TXOP transmission response TTF RSP transmitted by the STA as the TXOP holder, and periodically conducting polling for the RTA data transmission request by sequentially using an acknowledgement frame and a UL-OFDMA trigger frame, where the acknowledgement frame includes information about a request for the temporary TXOP control right, and the TTF RSP includes information about a response to the request for the temporary TXOP control right; or acquiring, by the AP by using a TXOP transmission instruction frame or indication data, the temporary TXOP control right released by the STA as the TXOP holder, and periodically conducting polling for the RTA data transmission request by transmitting a UL-OFDMA trigger frame.

In a possible implementation, the transmitting, by the STA, the RTA data over the secondary link with the assistance of the AP includes: allocating, by the AP, the TXOP control right to the STA; transmitting, by the STA, the RTA data over the secondary link; and returning, by the STA, the TXOP control right to the AP.

In a possible implementation, the transmitting, by the STA, the RTA data over the secondary link with the assistance of the AP includes: transmitting, by the STA, the RTA data in a UL-OFDMA format over the secondary link based on configuration conducted by the AP.

In a possible implementation, the transmitting, by the STA, the RTA data over the primary link with the assistance of the AP includes: allocating, by the AP, the TXOP control right to the STA; transmitting, by the STA, the RTA data over the primary link; and returning, by the STA, the TXOP control right to the AP.

In a possible implementation, the transmitting, by the STA, the RTA data over the primary link with the assistance of the AP includes: transmitting, by the STA, the RTA data in a UL-OFDMA format over the primary link based on configuration conducted by the AP.

In a possible implementation, the transmitting the duplicated RTA data over the secondary link at the high priority by using a TXOP holder further includes: adding a packet duration limit to the secondary link; and/or the transmitting the duplicated RTA data over the secondary link at the high priority by using a TXOP holder further includes: adding a TXOP limit to the secondary link.

In a possible implementation, the transmitting the RTA data over the primary link at the high priority by using a TXOP holder further includes: adding a packet duration limit to the primary link; and/or the transmitting the RTA data over the primary link at the high priority by using a TXOP holder further includes: adding a TXOP limit to the primary link.

In a possible implementation, the RTA data includes RTA service data.

According to a second aspect of the present disclosure, a multi-link data transmission apparatus is provided, including: a primary-link transmission unit, configured to transmit real time application (RTA) data over a primary link; and a parallel transmission unit, configured to transmit the RTA data at a high priority under a condition that a repetition condition is triggered.

In a possible implementation, the parallel transmission unit is configured to: transmit the RTA data over a secondary link at the high priority under a condition that the repetition condition is triggered; and/or transmit the RTA data over the primary link at the high priority under a condition that the repetition condition is triggered.

In a possible implementation, the repetition condition includes: transmission of the RTA data over the primary link is not completed within a time threshold.

In a possible implementation, the repetition condition that the transmission of the RTA data over the primary link is not completed within the time threshold includes: the transmission of the RTA data fails; or the primary link is congested due to interference; or the RTA data is congested by a transmission queue system of the primary link.

In a possible implementation, the parallel transmission unit includes: a primary-link transmission subunit, configured to: under a condition that the repetition condition is triggered, continue to transmit the RTA data over the primary link at the high priority; a duplication subunit, configured to duplicate the RTA data; and a secondary-link transmission subunit, configured to: transmit the duplicated RTA data over the secondary link at the high priority by using a transmission opportunity (TXOP) holder.

In a possible implementation, the parallel transmission unit includes: a primary-link transmission subunit, configured to: under a condition that the repetition condition is triggered, transmit the RTA data over the primary link at the high priority by using a TXOP holder.

In a possible implementation, the transmitting the duplicated RTA data over the secondary link at the high priority by using a TXOP holder includes: The secondary-link transmission subunit transmits the RTA data at the high priority under a condition that the secondary link is in a channel idle state; the secondary-link transmission subunit transmits the RTA data over the secondary link at the high priority under a condition that an RTA data transmitting terminal is consistent with the TXOP holder; or the secondary-link transmission subunit transmits the RTA data over the secondary link at the high priority under a condition that an RTA data transmitting terminal is inconsistent with the TXOP holder.

In a possible implementation, the transmitting the RTA data over the primary link at the high priority by using a TXOP holder includes: The primary-link transmission subunit transmits the RTA data at the high priority under a condition that the primary link is in a channel idle state; the primary-link transmission subunit transmits the RTA data over the primary link at the high priority under a condition that an RTA data transmitting terminal is consistent with the TXOP holder; or the primary-link transmission subunit transmits the RTA data over the primary link at the high priority under a condition that an RTA data transmitting terminal is inconsistent with the TXOP holder.

In a possible implementation, that the secondary-link transmission subunit transmits the RTA data at the high priority under a condition that the secondary link is in the channel idle state includes: The secondary-link transmission subunit adds the RTA data to a waiting list of the secondary link under a condition that the secondary link is in the channel idle state, to immediately transmit the RTA data; or the secondary-link transmission subunit contends, by using a contention window, for a channel in the secondary link under a condition that the secondary link is in the channel idle state, to transmit the RTA data.

In a possible implementation, that the secondary-link transmission subunit transmits the RTA data over the secondary link at the high priority under a condition that the RTA data transmitting terminal is consistent with the TXOP holder includes: The secondary-link transmission subunit transmits, by inserting the RTA data into a current TXOP queue, the RTA data over the secondary link under a condition that the RTA data transmitting terminal is consistent with the TXOP holder.

In a possible implementation, that the primary-link transmission subunit transmits the RTA data at the high priority under a condition that the primary link is in the channel idle state includes: The primary-link transmission subunit adds the RTA data to a waiting list of the primary link under a condition that the primary link is in the channel idle state, to immediately transmit the RTA data; or the primary-link transmission subunit contends, by using a contention window, for a channel in the primary link under a condition that the primary link is in the channel idle state, to transmit the RTA data.

In a possible implementation, that the primary-link transmission subunit transmits the RTA data over the primary link at the high priority under a condition that the RTA data transmitting terminal is consistent with the TXOP holder includes: The primary-link transmission subunit transmits, by inserting the RTA data into a current TXOP queue, the RTA data over the primary link under a condition that the RTA data transmitting terminal is consistent with the TXOP holder.

In a possible implementation, that the secondary-link transmission subunit transmits the RTA data over the secondary link at the high priority under a condition that the RTA data transmitting terminal is inconsistent with the TXOP holder includes: The secondary-link transmission subunit transmits the RTA data over the secondary link at the high priority under a condition that the RTA data transmitting terminal is a wireless access point (AP) and the TXOP holder is a wireless access station (STA); the secondary-link transmission subunit transmits the RTA data over the secondary link at the high priority under a condition that the RTA data transmitting terminal is an STA and the TXOP holder is an AP; or the secondary-link transmission subunit transmits the RTA data over the secondary link at the high priority under a condition that the RTA data transmitting terminal and the TXOP holder are different STAs.

In a possible implementation, that the primary-link transmission subunit transmits the RTA data over the primary link at the high priority under a condition that the RTA data transmitting terminal is inconsistent with the TXOP holder includes: The primary-link transmission subunit transmits the RTA data over the primary link at the high priority under a condition that the RTA data transmitting terminal is a wireless AP and the TXOP holder is a wireless access STA; the primary-link transmission subunit transmits the RTA data over the primary link at the high priority under a condition that the RTA data transmitting terminal is an STA and the TXOP holder is an AP; or the primary-link transmission subunit transmits the RTA data over the primary link at the high priority under a condition that the RTA data transmitting terminal and the TXOP holder are different STAs.

In a possible implementation, that the secondary-link transmission subunit transmits the RTA data over the secondary link at the high priority under a condition that the RTA data transmitting terminal is a wireless AP and the TXOP holder is a wireless access STA includes: The secondary-link transmission subunit takes over a TXOP control right from the STA over the secondary link; the secondary-link transmission subunit transmits the RTA data over the secondary link by using a TXOP; and the secondary-link transmission subunit returns the TXOP control right to the STA over the secondary link.

In a possible implementation, that the primary-link transmission subunit transmits the RTA data over the primary link at the high priority under a condition that the RTA data transmitting terminal is a wireless AP and the TXOP holder is a wireless access STA includes: the primary-link transmission subunit takes over a TXOP control right from the STA over the primary link; the primary-link transmission subunit transmits the RTA data over the primary link by using a TXOP; and the primary-link transmission subunit returns the TXOP control right to the STA over the primary link.

In a possible implementation, that the secondary-link transmission subunit transmits the RTA data over the secondary link at the high priority under a condition that the RTA data transmitting terminal is an STA and the TXOP holder is an AP includes: The secondary-link transmission subunit transmits the RTA data over the secondary link at the high priority under a condition that the RTA data transmitting terminal is an STA, the TXOP holder is an AP, and the STA is a receiving STA corresponding to the AP; or the secondary-link transmission subunit transmits the RTA data over the secondary link at the high priority under a condition that the RTA data transmitting terminal is an STA, the TXOP holder is an AP, and the STA is not a receiving STA corresponding to the AP.

In a possible implementation, that the primary-link transmission subunit transmits the RTA data over the primary link at the high priority under a condition that the RTA data transmitting terminal is an STA and the TXOP holder is an AP includes: The primary-link transmission subunit transmits the RTA data over the primary link at the high priority under a condition that the RTA data transmitting terminal is an STA, the TXOP holder is an AP, and the STA is a receiving STA corresponding to the AP; or the primary-link transmission subunit transmits the RTA data over the primary link at the high priority under a condition that the RTA data transmitting terminal is an STA, the TXOP holder is an AP, and the STA is not a receiving STA corresponding to the AP.

In a possible implementation, that the secondary-link transmission subunit transmits the RTA data over the secondary link at the high priority under a condition that the RTA data transmitting terminal is an STA, the TXOP holder is an AP, and the STA is a receiving STA corresponding to the AP includes: The secondary-link transmission subunit transmits an RTA data transmission request to the AP over the secondary link by using an acknowledgement frame; and the secondary-link transmission subunit transmits the RTA data over the secondary link with the assistance of the AP.

In a possible implementation, that the secondary-link transmission subunit transmits the RTA data over the secondary link at the high priority under a condition that the RTA data transmitting terminal is an STA, the TXOP holder is an AP, and the STA is not a receiving STA corresponding to the AP includes: After the AP periodically polls a specified STA or a non-specified STA other than the specified STA for an RTA data transmission request by using an uplink orthogonal frequency division multiple access (UL-OFDMA) trigger frame, based on that the STA as the RTA data transmitting terminal is the specified STA, the secondary-link transmission subunit transmits the RTA data transmission request by using a specified resource unit, or based on that the STA as the RTA data transmitting terminal is the non-specified STA other than specified STA, the secondary-link transmission subunit transmits the RTA data transmission request by using a random access resource unit; and the secondary-link transmission subunit transmits the RTA data over the secondary link with the assistance of the AP.

In a possible implementation, that the primary-link transmission subunit transmits the RTA data over the primary link at the high priority under a condition that the RTA data transmitting terminal is an STA, the TXOP holder is an AP, and the STA is a receiving STA corresponding to the AP includes: The primary-link transmission subunit transmits an RTA data transmission request to the AP over the primary link by using an acknowledgement frame; and the primary-link transmission subunit transmits the RTA data over the primary link with the assistance of the AP.

In a possible implementation, that the primary-link transmission subunit transmits the RTA data over the primary link at the high priority under a condition that the RTA data transmitting terminal is an STA, the TXOP holder is an AP, and the STA is not a receiving STA corresponding to the AP includes: After the AP periodically polls a specified STA or a non-specified STA other than the specified STA for an RTA data transmission request by using a UL-OFDMA trigger frame, based on that the STA as the RTA data transmitting terminal is the specified STA, the primary-link transmission subunit transmits the RTA data transmission request by using a specified resource unit, or based on that the STA as the RTA data transmitting terminal is the non-specified STA other than specified STA, the primary-link transmission subunit transmits the RTA data transmission request by using a random access resource unit; and the primary-link transmission subunit transmits the RTA data over the primary link with the assistance of the AP.

In a possible implementation, that the secondary-link transmission subunit transmits the RTA data over the secondary link at the high priority under a condition that the RTA data transmitting terminal and the TXOP holder are different STAs includes: After the AP acquires a temporary TXOP control right from the STA as the TXOP holder, and periodically conducts polling for an RTA data transmission request, the secondary-link transmission subunit of the STA as the RTA data transmitting terminal transmits the RTA data transmission request by using a specified resource unit or a non-specified resource unit other than the specified resource unit, and transmits the RTA data over the secondary link with the assistance of the AP, where the AP further returns the TXOP control right to the STA as the TXOP holder after the secondary-link transmission subunit transmits the RTA data.

In a possible implementation, that the primary-link transmission subunit transmits the RTA data over the primary link at the high priority under a condition that the RTA data transmitting terminal and the TXOP holder are different STAs includes: After the AP acquires a temporary TXOP control right from the STA as the TXOP holder, and periodically conducts polling for an RTA data transmission request, the primary-link transmission subunit of the STA as the RTA data transmitting terminal transmits the RTA data transmission request by using a specified resource unit or a non-specified resource unit other than the specified resource unit, and transmits the RTA data over the primary link with the assistance of the AP, where the AP further returns the TXOP control right to the STA as the TXOP holder after the primary-link transmission subunit transmits the RTA data.

In a possible implementation, that the AP acquires the temporary TXOP control right from the STA as the TXOP holder, and periodically conducts polling for the RTA data transmission request includes: The AP acquires the temporary TXOP control right from the STA as the TXOP holder, and periodically conducts polling for the RTA data transmission request by using a cascading trigger frame, where the cascading trigger frame includes a cascade of an acknowledgement frame and a UL-OFDMA trigger frame, and the cascading trigger frame includes information about a request for the temporary TXOP control right; or the AP acquires the temporary TXOP control right from the STA as the TXOP holder, and periodically conducts polling for the RTA data transmission request by sequentially using an acknowledgement frame and a UL-OFDMA trigger frame, where the acknowledgement frame includes information about a request for the temporary TXOP control right; or the AP acquires the temporary TXOP control right by receiving a TXOP transmission response TTF RSP transmitted by the STA as the TXOP holder, and periodically conducts polling for the RTA data transmission request by sequentially using an acknowledgement frame and a UL-OFDMA trigger frame, where the acknowledgement frame includes information about a request for the temporary TXOP control right, and the TTF RSP includes information about a response to the request for the temporary TXOP control right; or the AP acquires, by using a TXOP transmission instruction frame or indication data, the temporary TXOP control right released by the STA as the TXOP holder, and periodically conducts polling for the RTA data transmission request by transmitting a UL-OFDMA trigger frame.

In a possible implementation, that the secondary-link transmission subunit transmits the RTA data over the secondary link with the assistance of the AP includes: After the AP allocates the TXOP control right to the STA, the secondary-link transmission subunit transmits the RTA data over the secondary link, and then returns the TXOP control right to the AP.

In a possible implementation, that the secondary-link transmission subunit transmits the RTA data over the secondary link with the assistance of the AP includes: The secondary-link transmission subunit transmits the RTA data in a UL-OFDMA format over the secondary link based on configuration conducted by the AP.

In a possible implementation, that the primary-link transmission subunit transmits the RTA data over the primary link with the assistance of the AP includes: After the AP allocates the TXOP control right to the STA, the primary-link transmission subunit transmits the RTA data over the primary link, and then returns the TXOP control right to the AP.

In a possible implementation, that the primary-link transmission subunit transmits the RTA data over the primary link with the assistance of the AP includes: The primary-link transmission subunit transmits the RTA data in a UL-OFDMA format over the primary link based on configuration conducted by the AP.

In a possible implementation, the transmitting the duplicated RTA data over the secondary link at the high priority by using a TXOP holder further includes: adding a packet duration limit to the secondary link; and/or adding a TXOP limit to the secondary link.

In a possible implementation, the transmitting the RTA data over the primary link at the high priority by using a TXOP holder further includes: adding a packet duration limit to the primary link; and/or adding a TXOP limit to the primary link.

In a possible implementation, the RTA data includes RTA service data.

According to a third aspect of the present disclosure, a multi-link data transmission apparatus is provided, including a processor; and a memory, configured to store a processor-executable instruction, where the processor is configured to implement the method in the first aspect.

According to a fourth aspect of the present disclosure, a non-transitory computer-readable storage medium is provided, where the computer-readable storage medium stores a computer program instruction, and when the computer program instruction is executed by a processor, the method in the first aspect is implemented.

According to the following detailed description of exemplary embodiments with reference to the accompanying drawings, other features and aspects of the present disclosure will become clear.

BRIEF DESCRIPTION OF DRAWINGS

The accompanying drawings included in the specification and constituting a part of the specification, together with the specification, illustrate exemplary embodiments, features, and aspects of the present disclosure, and are used to explain the principles of the present disclosure.

DESCRIPTION OF EMBODIMENTS

Figure 1:
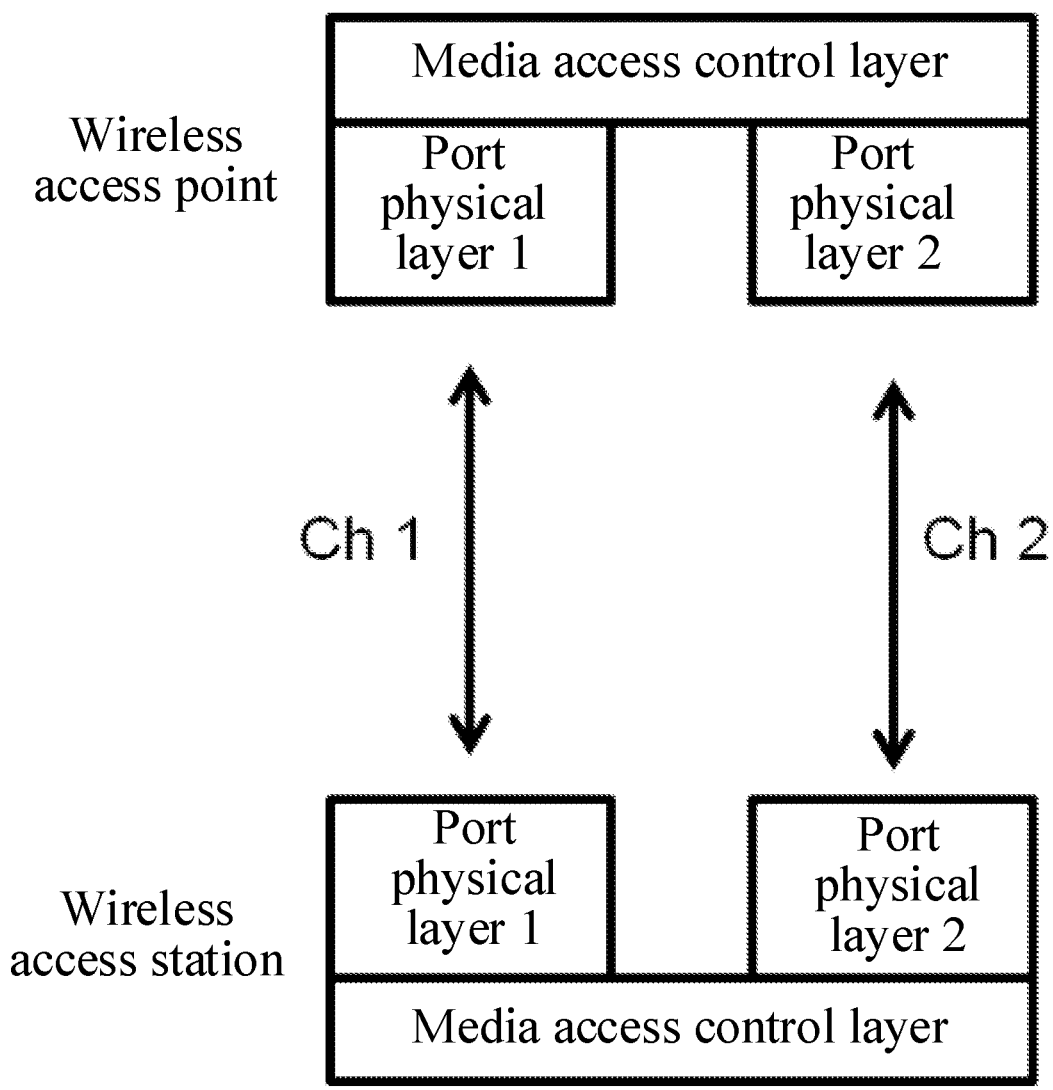
FIG. 1 is a schematic diagram of an application example according to the present disclosure.

Various exemplary embodiments, features, and aspects of the present disclosure will be described in detail below with reference to the accompanying drawings. The same reference numerals in the accompanying drawings indicate elements with the same or similar functions. Although various aspects of the embodiments are shown in the accompanying drawings, unless otherwise noted, the accompanying drawings are not necessarily drawn to scale.

The dedicated word "exemplary" here means "serving as an example, embodiment, or illustration". Any embodiment described herein as "exemplary" need not be construed as being superior to or better than other embodiments.

In addition, to better illustrate the present disclosure, numerous specific details are given in the following specific implementations. Person skilled in the art should understand that the present disclosure can also be implemented without some specific details. In some examples, the methods, means, elements, and circuits well-known to person skilled in the art are not described in detail in order to highlight the subject matter of the present disclosure.

An average delay of wireless broadband Wi-Fi has reached a desirable level, but a delay in a worst case still cannot be ensured. The delay in a worst case may be dozens of times the average delay sometimes. As a result, user experience of some applications such as mobile games, wireless AR applications, and wireless VR applications becomes undesirable.

To resolve the foregoing problem, the embodiments disclose an application example of a method for multi-link data transmission. FIG. 1 is a schematic diagram of an application example according to the present disclosure. It can be learned from the figure that, at a media access control (MAC) layer, CH1 and CH2 are two different channels, and bands in which CH1 and CH2 exist may be the same or different. In this example, a band in which CH1 exists is 2 GHz, and a band in which CH2 exists is 5 GHz. An RTA link is established in one of the channels. In this example, the RTA link is established in the channel CH1. To be specific, an RTA service may be transmitted over CH1 (the RTA service is essentially a type of data, and in the present disclosure, the RTA service is also referred to as RTA data, an RTA service transmitting terminal is also referred to as an RTA data transmitting terminal, an RTA service transmission request is also referred to as an RTA data transmission request, and the RTA data includes RTA service data). Therefore, CH1 may be referred to as a primary link. To control a delay of the RTA service in a worst case, in this example, when a repetition condition is triggered, an RTA link may also be established in CH2. In this case, a current RTA service may be transmitted over CH2 at a high priority, to ensure transmission of the RTA service, thereby improving the delay of the RTA service in the worst case. In this case, CH2 may be referred to as a secondary link.

The method for multi-link data transmission may include the following steps:

Transmitting RTA data over a primary link; and

Transmitting the RTA data at a high priority when a repetition condition is triggered.

Figure 2:
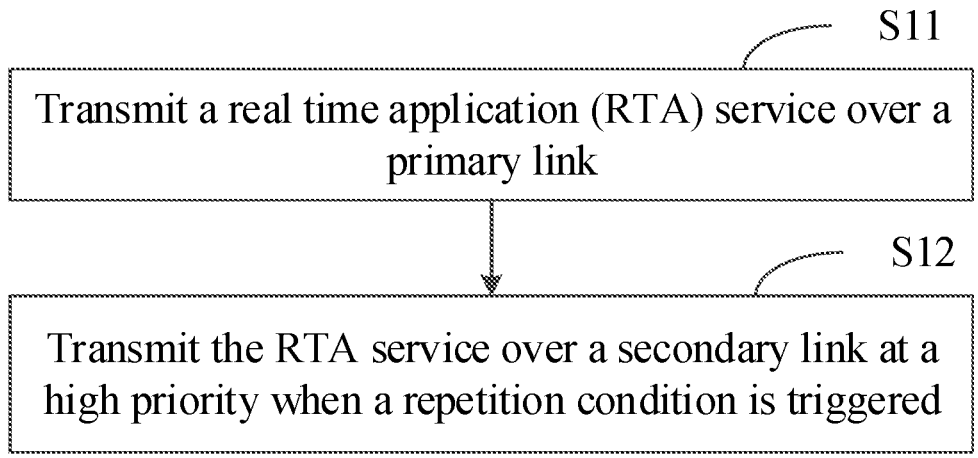
FIG. 2 is a flowchart of a method for multi-link data transmission according to an embodiment of the present disclosure.

FIG. 2 is a flowchart of a method for multi-link data transmission according to an embodiment of the present disclosure. As shown in FIG. 2, the method may include the following steps:

S11. Transmit an RTA service over a primary link; and

S12. Transmit the RTA service over a secondary link at a high priority when a repetition condition is triggered.

A manner of triggering the repetition condition is not limited, and the repetition condition may be triggered unconditionally. In other words, the repetition condition can be directly triggered in any case. In this case, the RTA service can be transmitted over the secondary link at the high priority. Alternatively, the repetition condition may be triggered in some specific conditions, and these specific conditions may be set depending on actual cases. In a possible implementation, the repetition condition may include: transmission of the RTA service is not completed over the primary link within a time threshold. That transmission of the RTA service is not completed may be that an acknowledgement frame (ACK) or a block ACK frame transmitted by a receiving terminal is not received. A value of the time threshold is not limited, and may vary with the trigger of the repetition condition. The time threshold has different values. This is not limited herein. A manner in which the transmission of the RTA service is not completed over the primary link within the time threshold is also not limited, and there may be multiple cases.

In a possible implementation, that transmission of the RTA service over the primary link is not completed within a time threshold may include the following cases: transmission of the RTA service fails; the primary link is congested due to interference; or the RTA service is congested by a transmission queue system of the primary link. In an example, that transmission of the RTA service fails may refer to that the RTA service is transmitted but a receiving terminal fails to receive the RTA service. In an example, that the primary link is congested due to interference may refer to that the RTA service has not been transmitted and interference is detected. In an example, that the RTA service is congested by a transmission queue system of the primary link may refer to that the RTA service has not been transmitted and no interference is detected.

Figure 3:
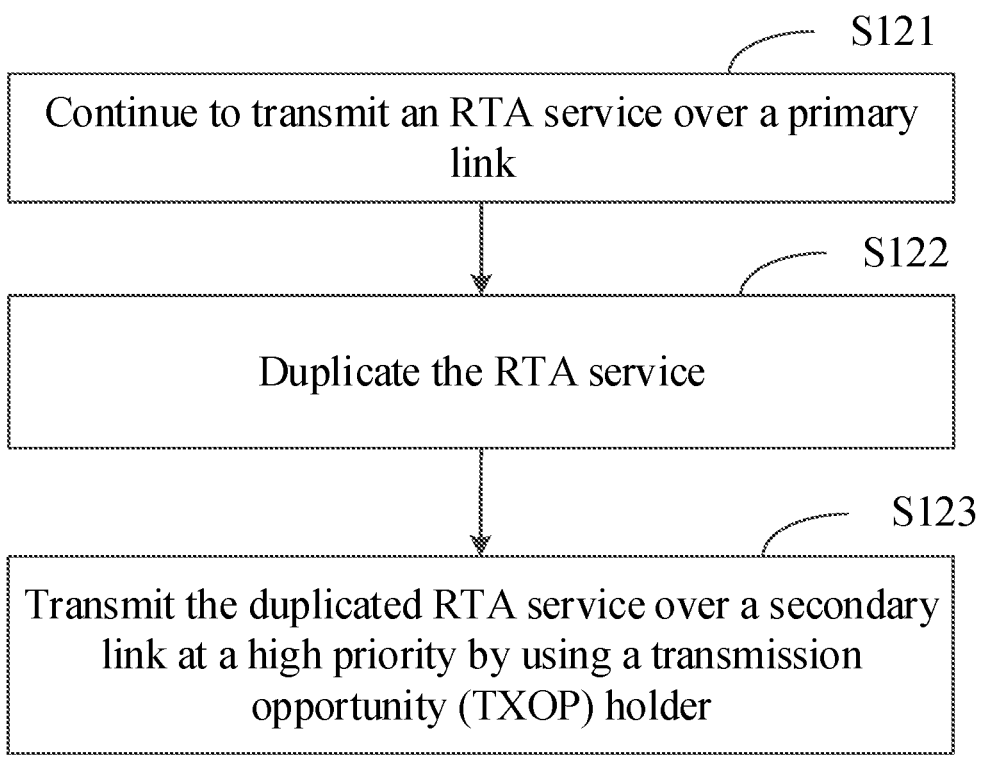
FIG. 3 is a flowchart of a method for multi-link data transmission according to an embodiment of the present disclosure.

Regardless of a trigger form of the repetition condition, once the repetition condition is triggered, a MAC layer transmits the RTA service over a secondary link at a high priority. For a specific manner of transmitting the RTA service over the secondary link at a high priority, there may be multiple cases. FIG. 3 is a flowchart of a method for multi-link data transmission according to an embodiment of the present disclosure. In a possible implementation, the transmitting the RTA service over a secondary link at a high priority may include the following steps:

S121. Continue to transmit the RTA service over the primary link.

S122. Duplicate the RTA service.

S123. Transmit the duplicated RTA service over the secondary link at the high priority by using a transmission opportunity (TXOP) holder.

To implement in-parallel transmission of the RTA service over the primary link and the secondary link, the RTA service needs to be duplicated first. A duplication manner is not limited and may be selected depending on an actual case. After the RTA service is duplicated, the duplicated RTA service may be transmitted over the secondary link at the high priority by using the TXOP holder. For an original process of conducting data transmission over the secondary link, there may be multiple cases. As original transmission conducted over the secondary link varies, a manner of transmitting the RTA service at the high priority by using the TXOP holder may vary accordingly.

In a possible implementation, step S123 may include: transmitting the RTA service at the high priority when the secondary link is in a channel idle state; or transmitting the RTA service over the secondary link at the high priority when an RTA service transmitting terminal is consistent with the TXOP holder; or transmitting the RTA service over the secondary link at the high priority when an RTA service transmitting terminal is inconsistent with the TXOP holder.

Figure 4:
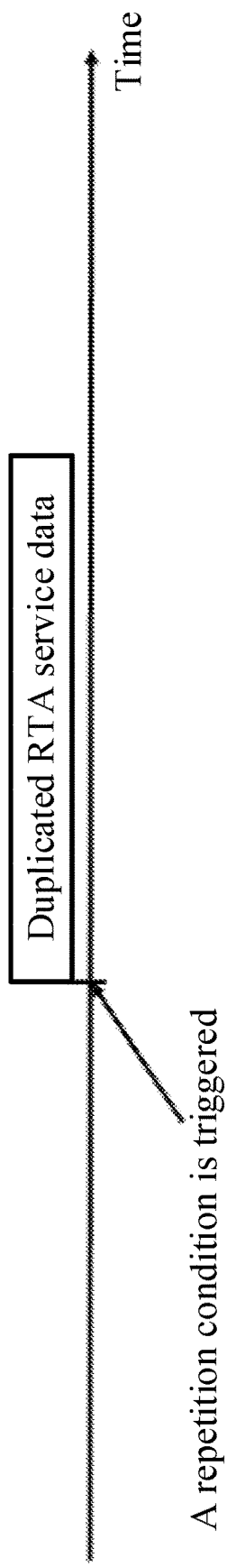
FIG. 4 is a schematic diagram of RTA service transmission conducted over a secondary link at a high priority according to an embodiment of the present disclosure.
Figure 5:
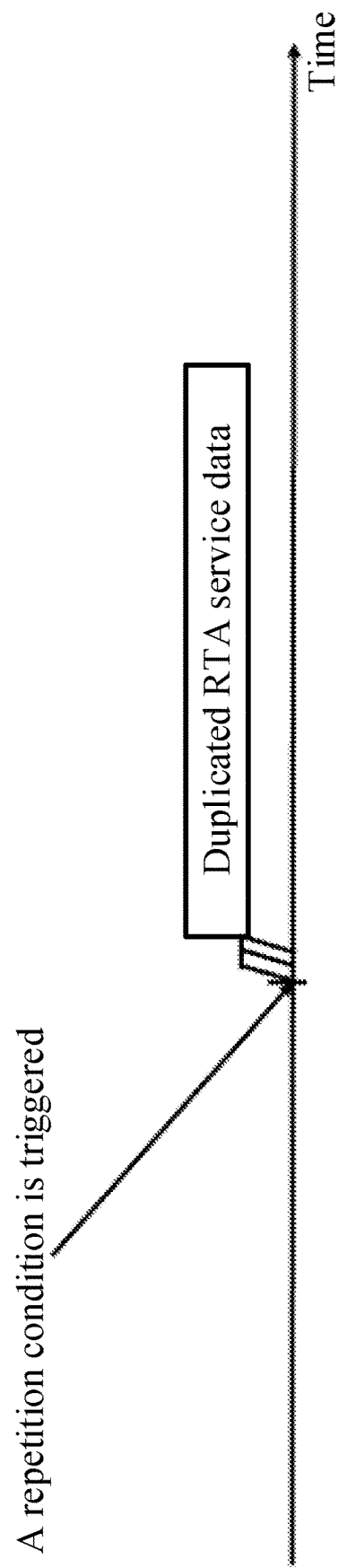
FIG. 5 is a schematic diagram of RTA service transmission conducted over a secondary link at a high priority according to an embodiment of the present disclosure.

In a possible implementation, the transmitting the RTA service at the high priority when the secondary link is in a channel idle state may include: adding, by the RTA service transmitting terminal, the RTA data to a waiting list of the secondary link when the secondary link is in the channel idle state, to immediately transmit the RTA service, or contending, by the RTA service transmitting terminal, by using a contention window, for a channel in the secondary link when the secondary link is in the channel idle state, to transmit the RTA service. FIG. 4 is a schematic diagram of RTA service transmission conducted over a secondary link at a high priority according to an embodiment of the present disclosure. As shown in FIG. 4, in an example, the secondary link is originally in an idle state. Therefore, an RTA service transmitting terminal may immediately add the duplicated RTA service data to a waiting list of the secondary link, and immediately transmit the RTA service data. FIG. 5 is a schematic diagram of RTA service transmission conducted over a secondary link at a high priority according to an embodiment of the present disclosure. As shown in FIG. 5, in an example, the secondary link is originally in an idle state. Therefore, an RTA service transmitting terminal may contend for a channel in the secondary link by using a contention window, such that the RTA service is transmitted over the secondary link after waiting for a time period corresponding to a relatively small waiting value, and the waiting value is determined depending on an actual case. This is not limited herein. The contention window may be a small contention window. An initial value of a general contention window is randomly obtained within an upper-limit range (eg 1-8) of the general window. A small contention window is a contention window whose initial value is randomly obtained by using a relatively small upper limit (eg 1-4) smaller than the upper limit of the general window.

Figure 6:
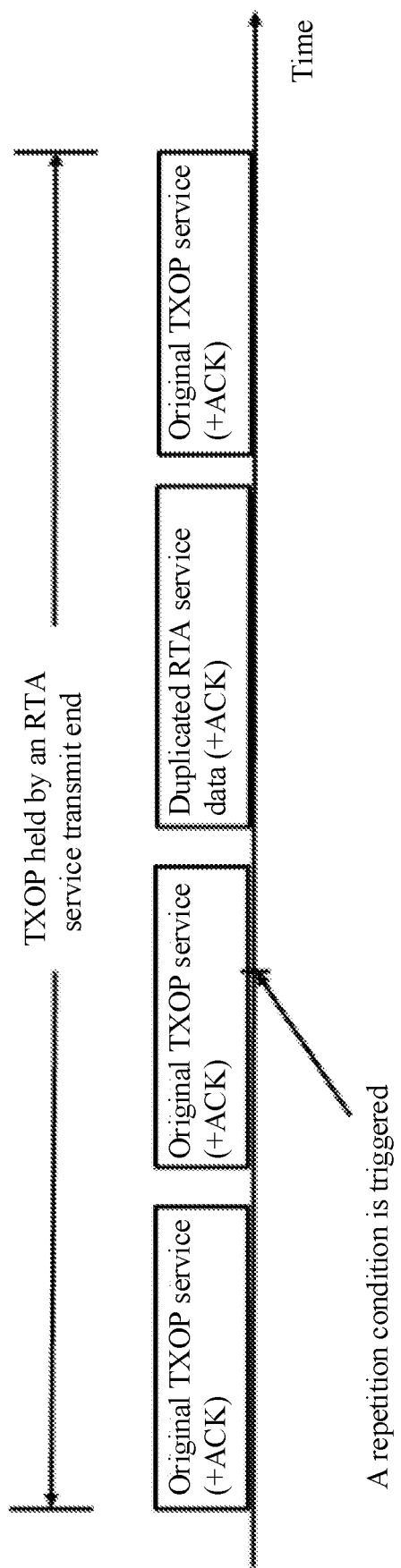
FIG. 6 is a schematic diagram of RTA service transmission conducted over a secondary link at a high priority according to an embodiment of the present disclosure.

In a possible implementation, the transmitting the RTA service over the secondary link at the high priority when an RTA service transmitting terminal is consistent with the TXOP holder may include: transmitting, by inserting the RTA service into a current TXOP queue, the RTA service over the secondary link when the RTA service transmitting terminal is consistent with the TXOP holder. FIG. 6 is a schematic diagram of RTA service transmission conducted over a secondary link at a high priority according to an embodiment of the present disclosure. As shown in FIG. 6, in an example, TXOP service data transmitted by an original TXOP holder is originally being transmitted over the secondary link normally, and when a repetition condition is triggered, an RTA service transmitting terminal may insert the duplicated RTA service into an original TXOP service transmit queue. In this way, the RTA service can be transmitted over the secondary link at the high priority as soon as possible, and an initial setting manner of the original TXOP service is not limited. In an example, the initial TXOP setting manner may be setting by using a traffic identifier (TID). In an example, the initial TXOP setting manner of the TXOP may be setting by using an access category (AC).

In the secondary link, there may be multiple different cases in which the RTA service transmitting terminal is inconsistent with the TXOP holder. In a possible implementation, the transmitting the RTA service over the secondary link at the high priority when an RTA service transmitting terminal is consistent with the TXOP holder may include: transmitting the RTA service over the secondary link at the high priority when the RTA service transmitting terminal is a wireless AP and the TXOP holder is a wireless access STA; or transmitting the RTA service over the secondary link at the high priority when the RTA service transmitting terminal is an STA and the TXOP holder is an AP; or transmitting the RTA service over the secondary link at the high priority when the RTA service transmitting terminal and the TXOP holder are different STAs.

Figure 7:
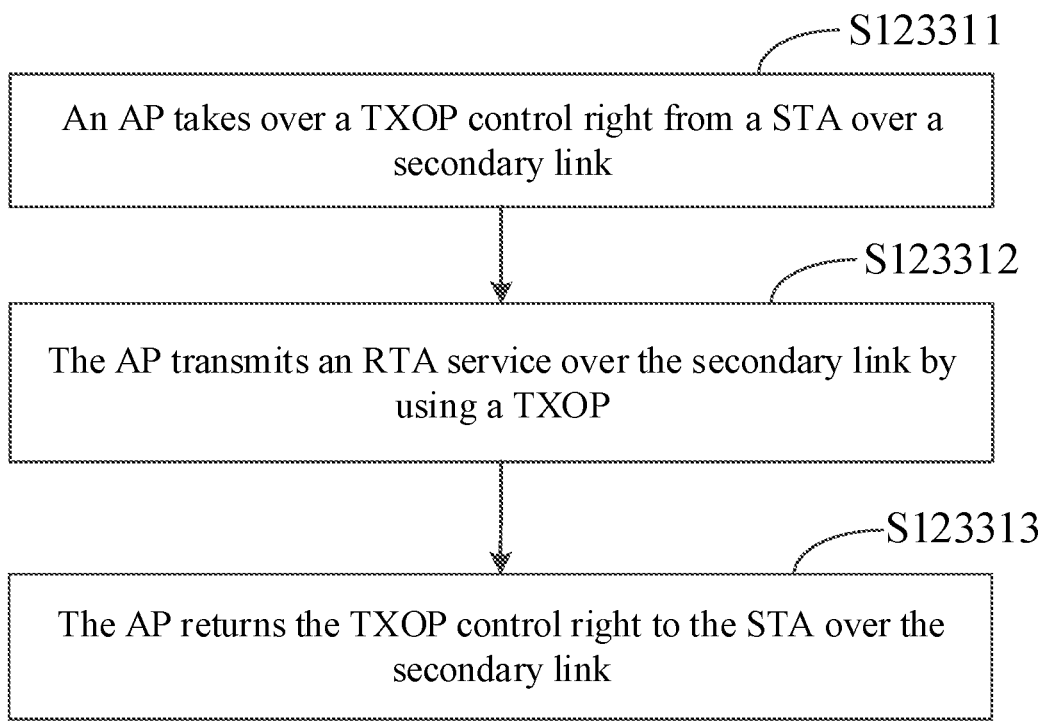
FIG. 7 is a flowchart of a method for multi-link data transmission according to an embodiment of the present disclosure.

FIG. 7 is a flowchart of a method for multi-link data transmission according to an embodiment of the present disclosure. As shown in FIG. 7, in a possible implementation, transmitting an RTA service over a secondary link at a high priority when an RTA service transmitting terminal is a wireless AP and a TXOP holder is a wireless access STA may include the following steps:

S123311. The AP takes over a TXOP control right from the STA over the secondary link.

S123312. The AP transmits the RTA service over the secondary link by using a TXOP.

S123313. The AP returns the TXOP control right to the STA over the secondary link.

Figure 8:
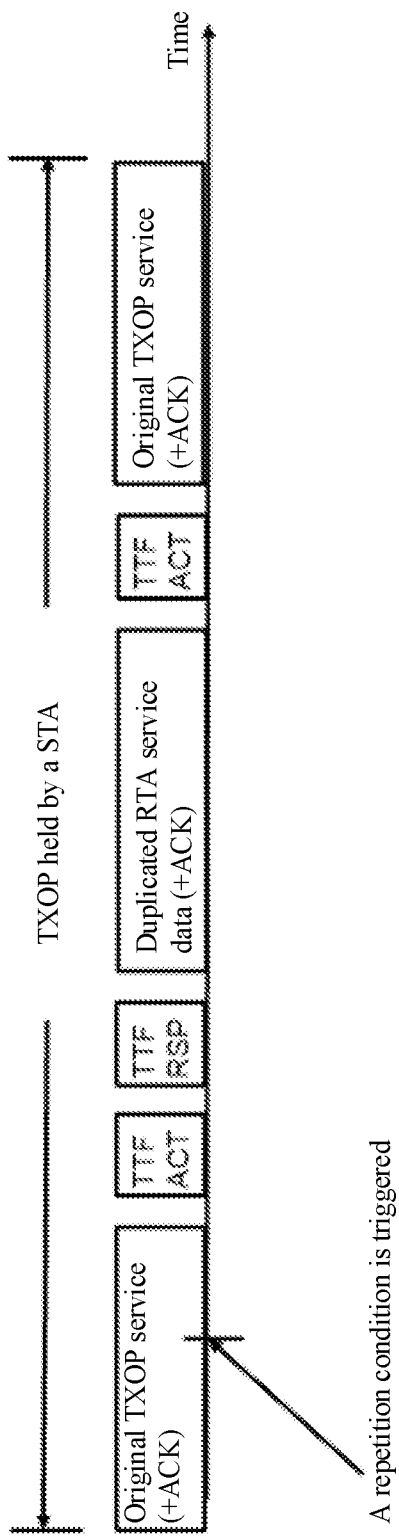
FIG. 8 is a schematic diagram of RTA service transmission conducted over a secondary link at a high priority according to an embodiment of the present disclosure.

A specific implementation of the foregoing process is not specifically limited and may be selected depending on an actual case. FIG. 8 is a schematic diagram of RTA service transmission conducted over a secondary link at a high priority according to an embodiment of the present disclosure. As shown in FIG. 8, in an example, in the secondary link, an RTA service transmitting terminal is an AP, and a TXOP holder is an STA. In this case, the AP acquires a temporary TXOP control right by using a TXOP transmission action frame TTF ACT, and after receiving a TXOP transmission response frame TTF RSP from the original TXOP holder STA, the AP starts to transmit RTA service data, to implement RTA service transmission. After the RTA service transmission is completed, the TXOP returns the temporary TXOP control right to the original TXOP holder STA by using another TTF ACT.

Figure 9:
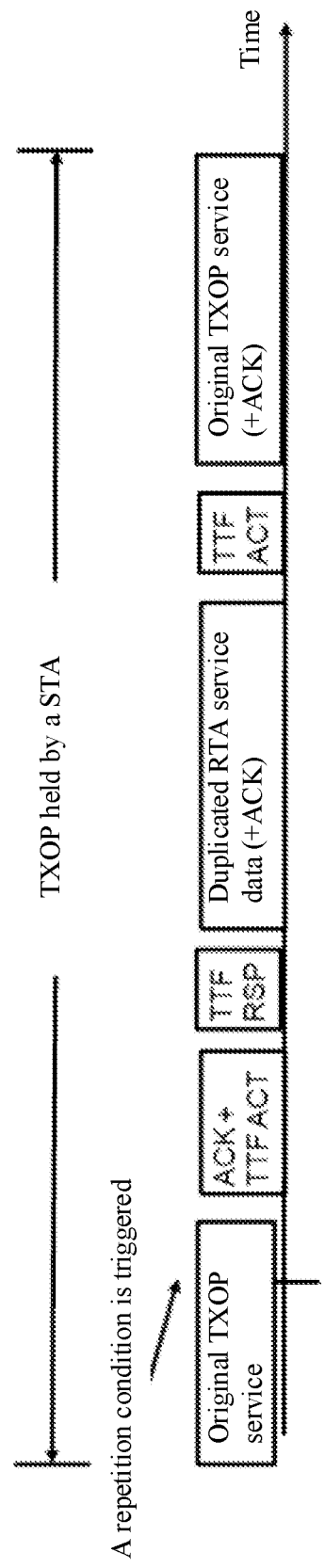
FIG. 9 is a schematic diagram of RTA service transmission conducted over a secondary link at a high priority according to an embodiment of the present disclosure.

FIG. 9 is a schematic diagram of RTA service transmission conducted over a secondary link at a high priority according to an embodiment of the present disclosure. As shown in FIG. 9, in an example, in the secondary link, an RTA service transmitting terminal is an AP, and a TXOP holder is an STA. In this case, the AP acquires a temporary TXOP control right by using ACK+TTF ACT, and after receiving a TXOP transmission response frame TTF RSP from the original TXOP holder STA, the AP starts to transmit RTA service data, to implement RTA service transmission. After the RTA service transmission is completed, the TXOP returns the temporary TXOP control right to the original TXOP holder STA by using another TTF ACT frame.

Figure 10:
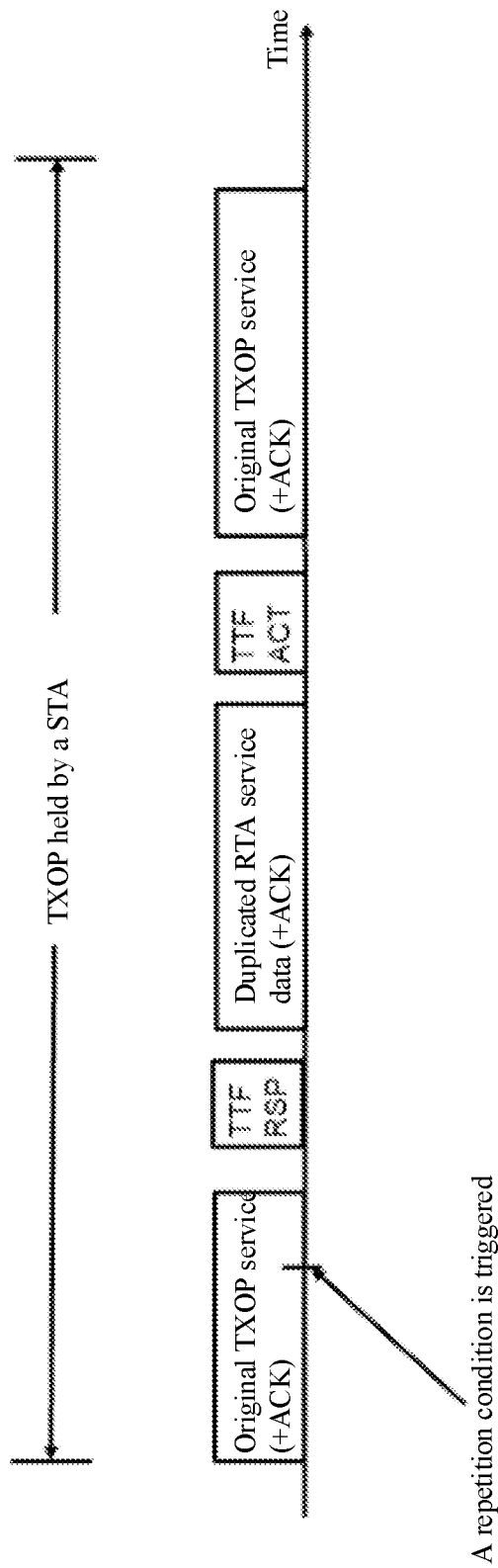
FIG. 10 is a schematic diagram of RTA service transmission conducted over a secondary link at a high priority according to an embodiment of the present disclosure.

FIG. 10 is a schematic diagram of RTA service transmission conducted over a secondary link at a high priority according to an embodiment of the present disclosure. As shown in FIG. 10, in an example, in the secondary link, an RTA service transmitting terminal is an AP, and a TXOP holder is an STA. After the AP invokes a TXOP transmission request by using an ACK packet in original service data, the STA authorizes a temporary TXOP control right to the AP by using TTF RSP, and the AP starts to transmit RTA service data to implement RTA service transmission. After the RTA service transmission is completed, the TXOP returns the temporary TXOP control right to the original TXOP holder STA by using TTF ACT.

In a possible implementation, the transmitting the RTA service over the secondary link at the high priority when the RTA service transmitting terminal is an STA and the TXOP holder is an AP may include: transmitting the RTA service over the secondary link at the high priority when the RTA service transmitting terminal is an STA, the TXOP holder is an AP, and the STA is a receiving STA corresponding to the AP; or transmitting the RTA service over the secondary link at the high priority when the RTA service transmitting terminal is an STA, the TXOP holder is an AP, and the STA is not a receiving STA corresponding to the AP.

In a possible implementation, the transmitting the RTA service over the secondary link at the high priority when the RTA service transmitting terminal is an STA, the TXOP holder is an AP, and the STA is a receiving STA corresponding to the AP may include the following steps:

Transmitting, by the STA, an RTA service transmission request to the AP over the secondary link by using an acknowledgement frame; and Transmitting, by the STA, the RTA service over the secondary link with the assistance of the AP.

In a possible implementation, the transmitting the RTA service over the secondary link at the high priority when the RTA service transmitting terminal is an STA, the TXOP holder is an AP, and the STA is not a receiving STA corresponding to the AP may include the following steps:

Periodically polling, by the AP, a specified STA or a non-specified STA other than the specified STA for an RTA service transmission request by using a UL-OFDMA trigger frame;

Under a condition that the STA as the RTA service transmitting terminal is the specified STA, transmitting the RTA service transmission request by using a specified resource unit (RU), or under a condition that the STA as the RTA service transmitting terminal is the non-specified STA other than specified STA, transmitting the RTA service transmission request by using a random access resource unit (RA-RU); and Transmitting, by the STA as the RTA service transmitting terminal, the RTA service over the secondary link with the assistance of the AP.

Regardless of whether the STA as the RTA service transmitting terminal is a receiving STA corresponding to the AP or not, the STA finally used as the RTA service transmitting terminal needs to transmit the RTA service with the assistance of the AP. In a possible implementation, the transmitting, by the STA, the RTA service over the secondary link with the assistance of the AP may include the following steps:

Allocating, by the AP, the TXOP control right to the STA;

Transmitting, by the STA, the RTA service over the secondary link; and

Returning, by the STA, the TXOP control right to the AP.

In a possible implementation, the transmitting, by the STA, the RTA service over the secondary link with the assistance of the AP may include the following step: transmitting, by the STA, the RTA service in a UL-OFDMA format over the secondary link based on configuration conducted by the AP.

In an example, a specific process in which the STA transmits the RTA service in the UL-OFDMA format over the secondary link based on the instruction of the AP may be: The AP first conducts configuration for the RTA service from the STA by using an RTA TRG frame; and when being triggered by the RTA TRG frame, the RTA service data is transmitted in the UL-OFDMA format. If multiple STAs successfully transmit RTA service requests by using an RTA FBK packet, and the requests are all transmitted successfully, the AP may configure these services to be in a same UL-OFDMA packet, and the RTA service transmitting terminal may also indicate a buffer status of the RTA service data. If the RTA service transmitting terminal needs to transmit more service data, multiple RTA TRG trigger frames and UL-OFDMA packets may be configured consecutively.

Figure 11:
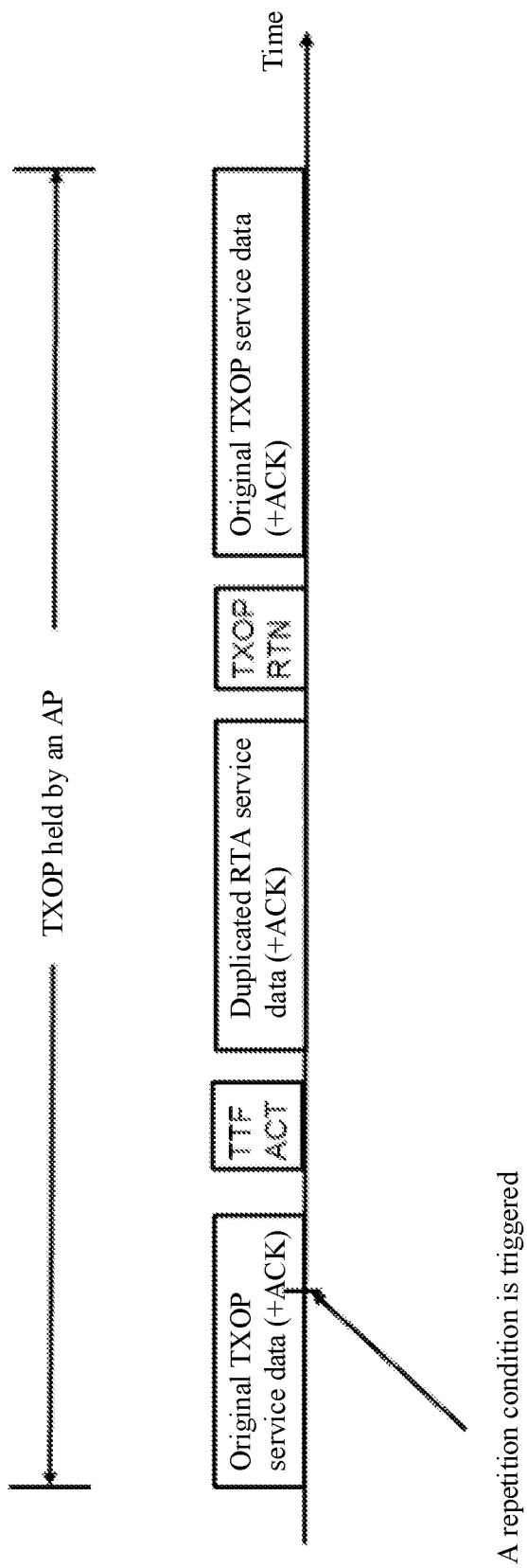
FIG. 11 is a schematic diagram of RTA service transmission conducted over a secondary link at a high priority according to an embodiment of the present disclosure.

FIG. 11 is a schematic diagram of RTA service transmission conducted over a secondary link at a high priority according to an embodiment of the present disclosure. As shown in FIG. 11, in an example, a process of transmitting an RTA service over the secondary link at the high priority when an RTA service transmitting terminal is an STA, a TXOP holder is an AP, and the STA is a receiving STA corresponding to the AP may be: after receiving an RTA service request from the STA by using an ACK, the AP authorizes a temporary TXOP control right to the STA by using TTF ACT; the STA starts to transmit RTA service data to transmit the RTA service; and after the transmission is completed, the STA returns the temporary TXOP control right to the AP by using a TXOP RTN frame.

Figure 12:
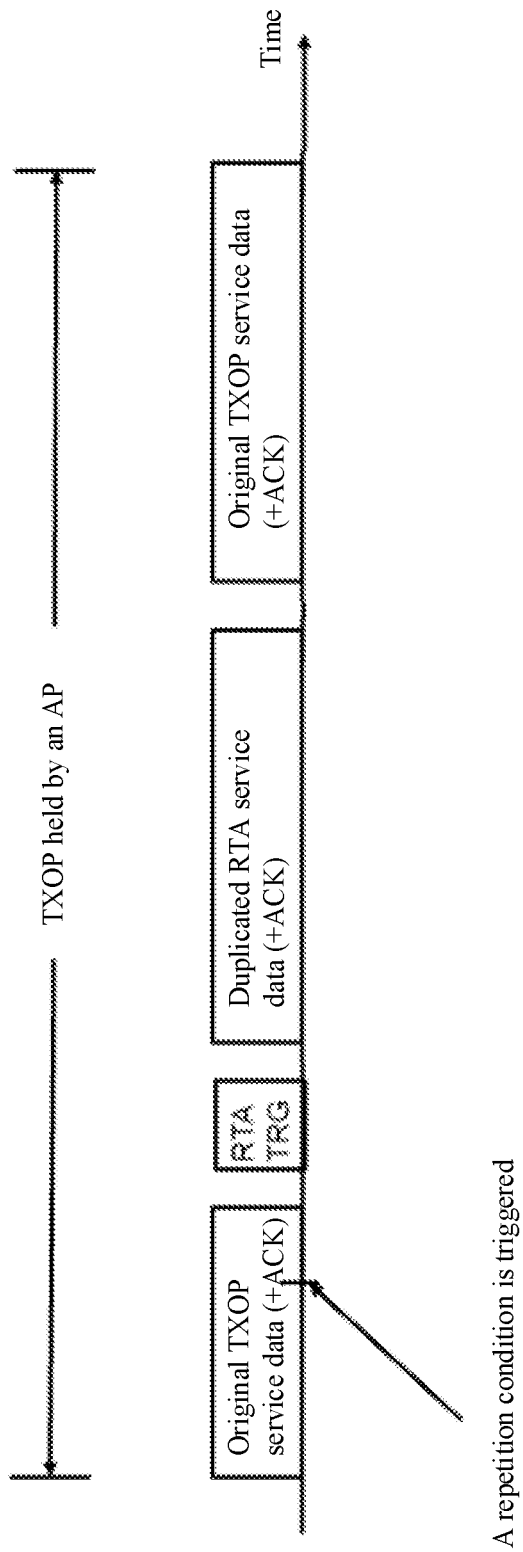
FIG. 12 is a schematic diagram of RTA service transmission conducted over a secondary link at a high priority according to an embodiment of the present disclosure.

FIG. 12 is a schematic diagram of RTA service transmission conducted over a secondary link at a high priority according to an embodiment of the present disclosure. As shown in FIG. 12, in an example, a process of transmitting an RTA service over the secondary link at the high priority when an RTA service transmitting terminal is an STA, a TXOP holder is an AP, and the STA is a receiving STA corresponding to the AP may be: after receiving an RTA service request from the STA by using an ACK packet, the AP conducts configuration for the RTA service for the STA by using RTA TRG, to allow the RTA service to be transmitted in a UL-OFDMA format triggered by the RTA TRG frame. The RTA service transmitting terminal may indicate a buffer status of the RTA data in the RTA service or an RTA service transmission request. If the RTA service transmitting terminal needs to transmit more data, multiple RTA trigger frames and UL-OFDMA packets may be configured.

Figure 13:
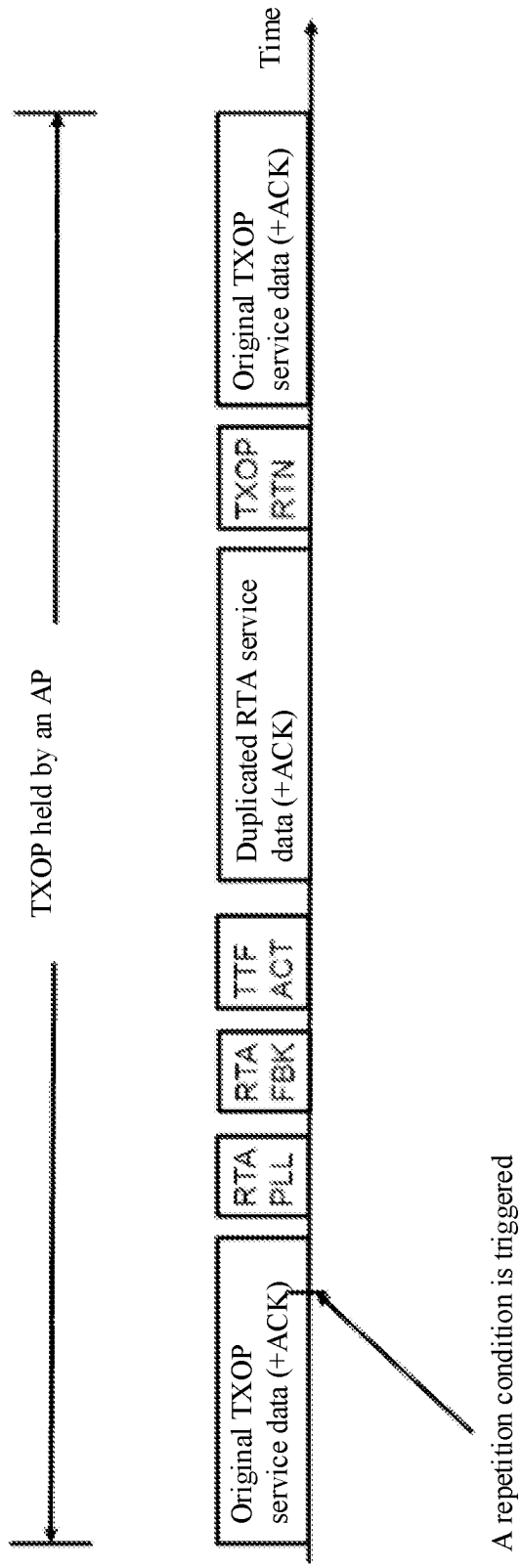
FIG. 13 is a schematic diagram of RTA service transmission conducted over a secondary link at a high priority according to an embodiment of the present disclosure.

FIG. 13 is a schematic diagram of RTA service transmission conducted over a secondary link at a high priority according to an embodiment of the present disclosure. As shown in FIG. 13, in an example, a process of transmitting an RTA service over the secondary link at the high priority when an RTA service transmitting terminal is an STA, a TXOP holder is an AP, and the STA is not a receiving STA corresponding to the AP may be: the AP periodically conducts polling for an RTA service transmission request by using an RTA PLL frame. The RTA PLL frame is a trigger frame and is used to trigger a UL-OFDMA packet RTA FBK. After receiving the RTA service transmission request from the STA included RTA FBK, the AP transmits TTF ACT to turn a control right over to the STA, such that the STA becomes a temporary TXOP holder. After acquiring the TXOP control right, the STA may transmit the RTA service data to implement RTA service transmission. After the transmission is completed, the STA returns the TXOP control right to the AP by using TXOP RTN. If multiple STAs successfully transmit RTA service transmission requests by using RTA FBK, the AP may perform configuration for the STAs one by one and repeat the foregoing process.

Figure 14:
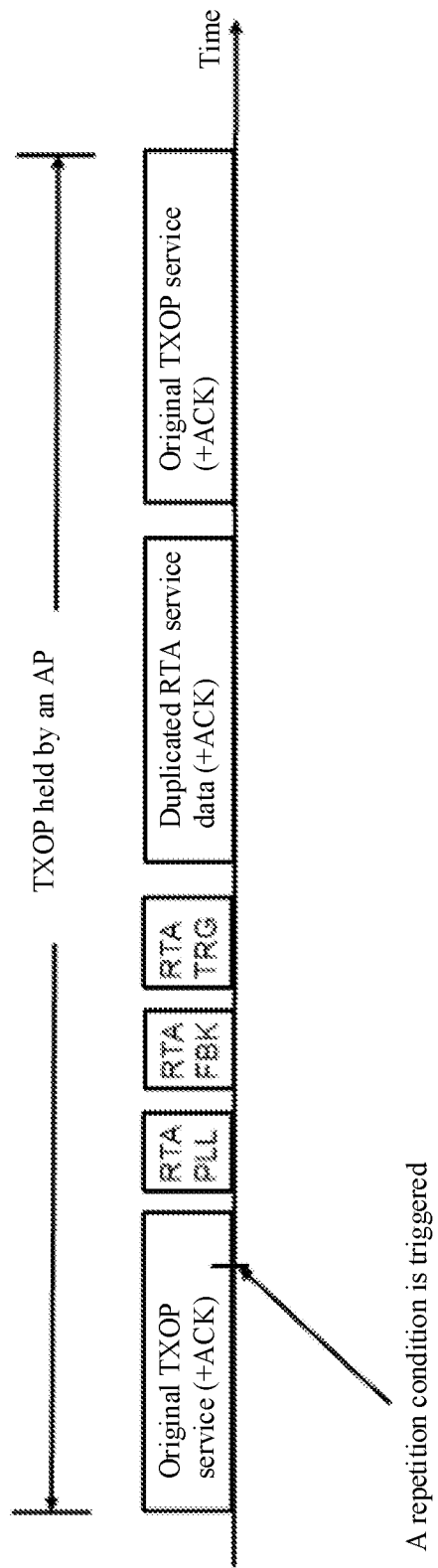
FIG. 14 is a schematic diagram of RTA service transmission conducted over a secondary link at a high priority according to an embodiment of the present disclosure.

FIG. 14 is a schematic diagram of RTA service transmission conducted over a secondary link at a high priority according to an embodiment of the present disclosure. As shown in FIG. 14, in an example, a process of transmitting an RTA service over the secondary link at the high priority when an RTA service transmitting terminal is an STA, a TXOP holder is an AP, and the STA is not a receiving STA corresponding to the AP may be an RTA service transmission process that is basically the same as the process shown in FIG. 13. A difference therebetween is that the AP performs configuration for the RTA service for the STA by using RTA TRG to allow the RTA service to be transmitted in a UL-OFDMA format triggered by an RTA TRG frame. If multiple STAs successfully transmit RTA service transmission requests by using RTA FBK, the AP may configure these RTA services to be in a same UL-OFDMA packet. The RTA service transmitting terminal may indicate a buffer status of the RTA data. If the RTA service transmitting terminal needs to transmit more data, multiple RTA TRGs and UL-OFDMA packets may be configured. In this example, the RTA FBK may further include buffer status information of the RTA data.

Figure 15:
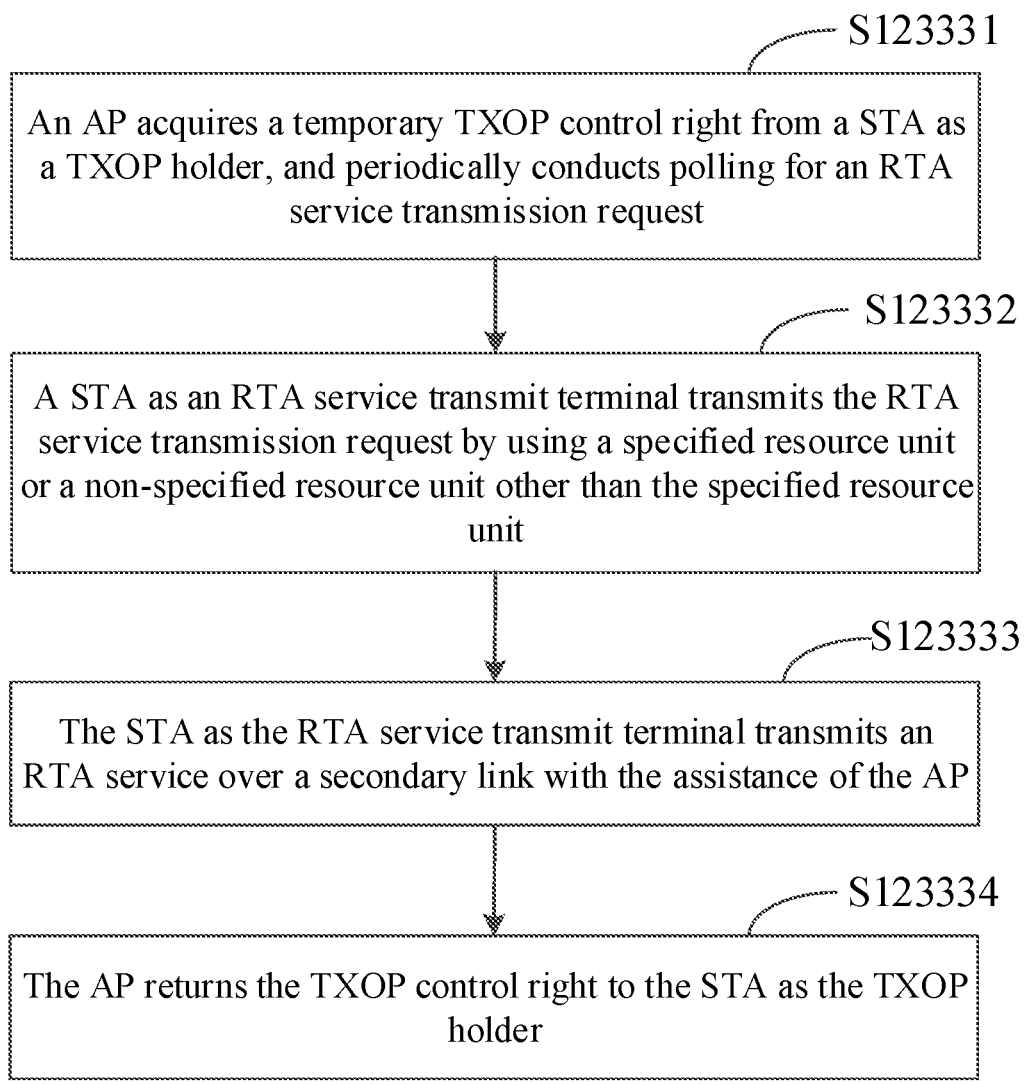
FIG. 15 is a flowchart of a method for multi-link data transmission according to an embodiment of the present disclosure.

FIG. 15 is a flowchart of a method for multi-link data transmission according to an embodiment of the present disclosure. As shown in FIG. 15, in a possible implementation, transmitting an RTA service over a secondary link at a high priority when an RTA service transmitting terminal and a TXOP holder are different STAs may include the following steps:

S123331. An AP acquires a temporary TXOP control right from an STA as a TXOP holder, and periodically conducts polling for an RTA service transmission request.

S123332. An STA as an RTA service transmitting terminal transmits the RTA service transmission request by using a specified resource unit or by a non-specified resource unit other than the specified resource unit.

S123333. The STA as the RTA service transmitting terminal transmits an RTA service over the secondary link with the assistance of the AP.

S123334. The AP returns the TXOP control right to the STA as the TXOP holder.

In the foregoing process, a manner of transmitting, by the STA as the RTA service transmitting terminal, the RTA service with the assistance of the AP is the same as that in a case in which the RTA service transmitting terminal is an STA and the TXOP is an AP. To be specific, the STA may acquire the TXOP control right from the AP and then conduct RTA service transmission, or may not acquire the control right from the AP but directly conducts RTA service transmission based on configuration conducted by the AP. Therefore, details are not specifically described herein. The AP acquires the temporary TXOP control right from the STA as the TXOP holder, and periodically conducts polling for the RTA service transmission request. There may be multiple implementations.

In a possible implementation, step S123331 may include: acquiring, by the AP, the temporary TXOP control right from the STA as the TXOP holder, and periodically conducting polling for the RTA service transmission request by using a cascading trigger frame, where the cascading trigger frame includes a cascade of an acknowledgement frame and a UL-OFDMA trigger frame, and the cascading trigger frame includes information about a request for the temporary TXOP control right; or acquiring, by the AP, the temporary TXOP control right from the STA as the TXOP holder, and periodically conducting polling for the RTA service request by sequentially using an acknowledgement frame and a UL-OFDMA trigger frame, where the acknowledgement frame includes information about a request for the temporary TXOP control right; or acquiring, by the AP, the temporary TXOP control right by receiving a TXOP transmission response TTF RSP transmitted by the STA as the TXOP holder, and periodically conducting polling for the RTA service request by sequentially using an acknowledgement frame and a UL-OFDMA trigger frame, where acknowledgement frame includes information about a request for the temporary TXOP control right, and the TTF RSP includes information about a response to the request for the temporary TXOP control right; or acquiring, by the AP by using a TXOP transmission instruction frame or indication data, the temporary TXOP control right proactively released by the STA as the TXOP holder, and periodically conducting polling for the RTA service request by transmitting a UL-OFDMA trigger frame.

In an example, a specific implementation form of acquiring, by the AP, the temporary TXOP control right from the STA as the TXOP holder, and periodically conducting polling for the RTA service transmission request by using a cascading trigger frame, where the cascading trigger frame includes a cascade of an acknowledgement frame and a UL-OFDMA trigger frame, and the cascading trigger frame includes information about a request for the temporary TXOP control right may be: the AP transmits ACK+RTA PLL to periodically conduct polling for the RTA service transmission request, where the RTA PLL is a UL-OFDMA trigger frame including a specified resource unit or a non-specified resource unit other than the specified resource unit, and ACK+RTA PLL may be a cascade of the acknowledgement frame and the UL-OFDMA trigger frame.

In an example, a specific implementation form of acquiring, by the AP, the temporary TXOP control right from the STA as the TXOP holder, and periodically conducting polling for the RTA service request by sequentially using an acknowledgement frame and a UL-OFDMA trigger frame, where the acknowledgement frame includes information about a request for the temporary TXOP control right may be basically the same as that in the foregoing example, and a difference therebetween is that the ACK and the RTA PLL are not cascaded.

In an example, a specific implementation form of acquiring, by the AP, the temporary TXOP control right by receiving a TXOP transmission response TTF RSP transmitted by the STA as the TXOP holder, and periodically conducting polling for the RTA service request by sequentially using an acknowledgement frame and a UL-OFDMA trigger frame, where the acknowledgement frame includes information about a request for the temporary TXOP control right, and the TTF RSP includes information about a response to the request for the temporary TXOP control right may be basically the same as that in the foregoing example, and a difference therebetween is that the STA as the TXOP holder transmits the TTF RSP after providing an acknowledgement.

In an example, a specific implementation form of acquiring, by the AP by using a TXOP transmission instruction frame or indication data, the temporary TXOP control right proactively released by the STA as the TXOP holder, and periodically conducting polling for the RTA service request by transmitting a UL-OFDMA trigger frame may be: the STA as the TXOP holder allocates the TXOP control right to the AP by using a TTF ACT frame or indication data, and the AP transmits an RTA PLL frame after receiving the control right.

Figure 16:
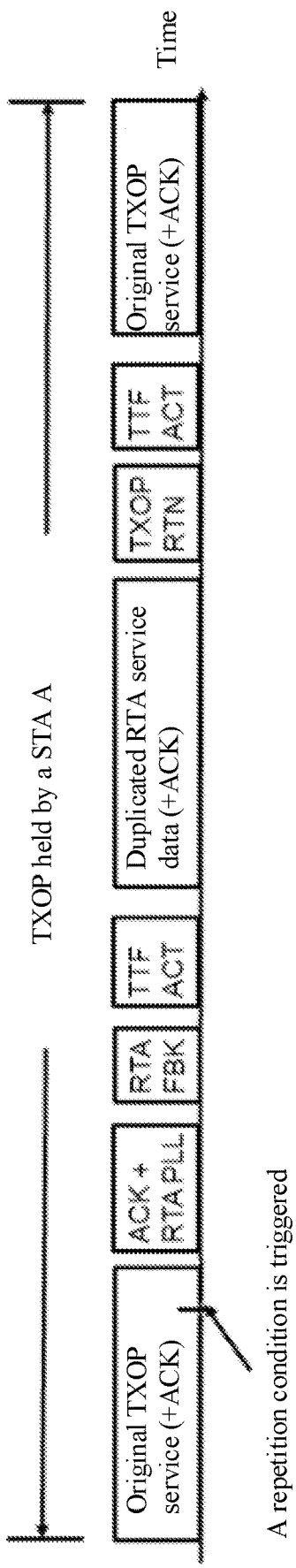
FIG. 16 is a schematic diagram of RTA service transmission conducted over a secondary link at a high priority according to an embodiment of the present disclosure.

FIG. 16 is a schematic diagram of RTA service transmission conducted over a secondary link at a high priority according to an embodiment of the present disclosure. As shown in FIG. 16, in an example, in the secondary link, an STA A is a TXOP holder, and an STA B is an RTA service transmitting terminal. To transmit an RTA service at the high priority, an AP transmits an ACK and RTA PLL that are cascaded, to acquire a TXOP control right, and after receiving an RTA service request transmitted by the STA B by using RTA FBK, the AP allocates the control right to the STA B by using TTF ACT; the STA B conducts RTA service transmission after acquiring the control right, and returns, after completing transmission, the control right to the AP by using TXOP RTN; and then the AP returns the control right to the STA A by using TTF ACT.

Figure 17:
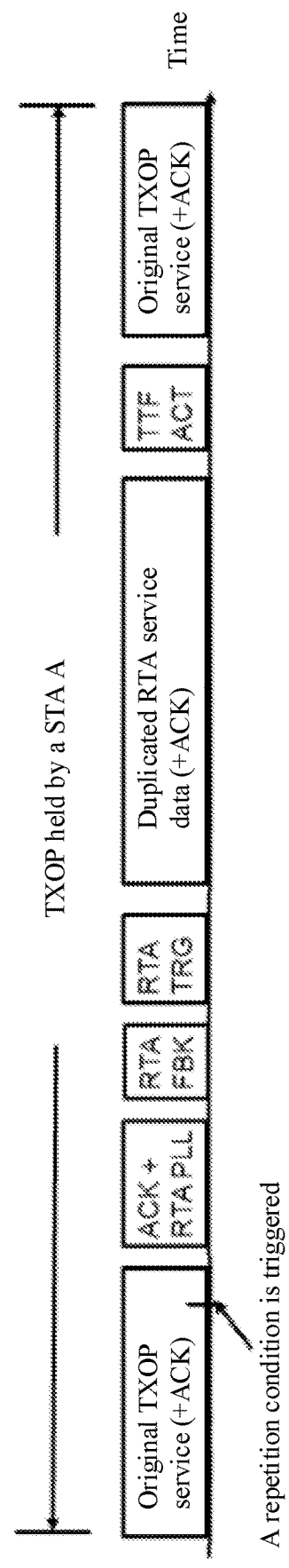
FIG. 17 is a schematic diagram of RTA service transmission conducted over a secondary link at a high priority according to an embodiment of the present disclosure.

FIG. 17 is a schematic diagram of RTA service transmission conducted over a secondary link at a high priority according to an embodiment of the present disclosure. As shown in FIG. 17, in an example, in the secondary link, an STA A is a TXOP holder, and an STAB is an RTA service transmitting terminal. To transmit an RTA service at the high priority, an AP transmits an ACK and RTA PLL that are cascaded, to acquire a TXOP control right; after receiving an RTA service request transmitted by the STA B by using RTA FBK, instructs, by using RTA TRG, the STA B to conduct RTA service transmission; and after transmission is completed, returns the control right to the STA A by using TTF ACT.

Figure 18:
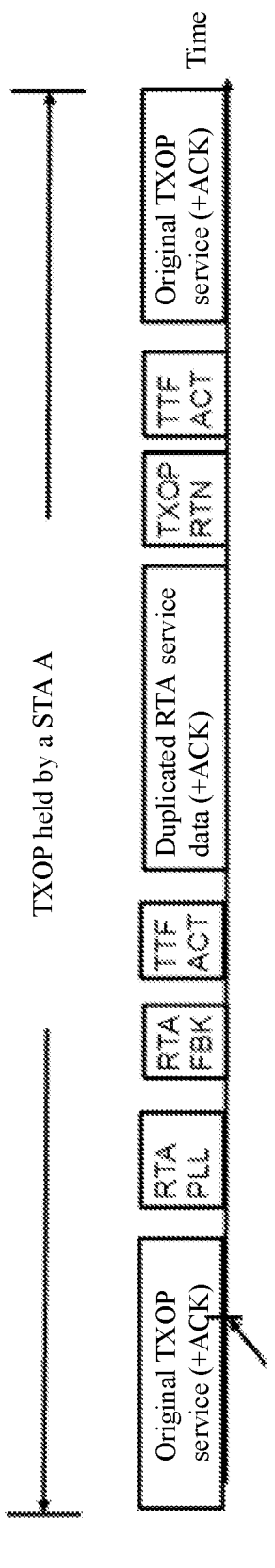
FIG. 18 is a schematic diagram of RTA service transmission conducted over a secondary link at a high priority according to an embodiment of the present disclosure.

FIG. 18 is a schematic diagram of RTA service transmission conducted over a secondary link at a high priority according to an embodiment of the present disclosure. As shown in FIG. 18, in an example, in the secondary link, an STA A is a TXOP holder, and an STAB is an RTA service transmitting terminal. To transmit an RTA service at the high priority, an AP sequentially transmits an ACK and RTA PLL that are not cascaded, to acquire a TXOP control right, and after receiving an RTA service request transmitted by the STA B by using RTA FBK, allocates the control right to the STAB by using TTF ACT; the STAB conducts RTA service transmission after acquiring the control right, and returns, after completing transmission, the control right to the AP by using TXOP RTN; and then the AP returns the control right to the STA A by using TTF ACT.

Figure 19:
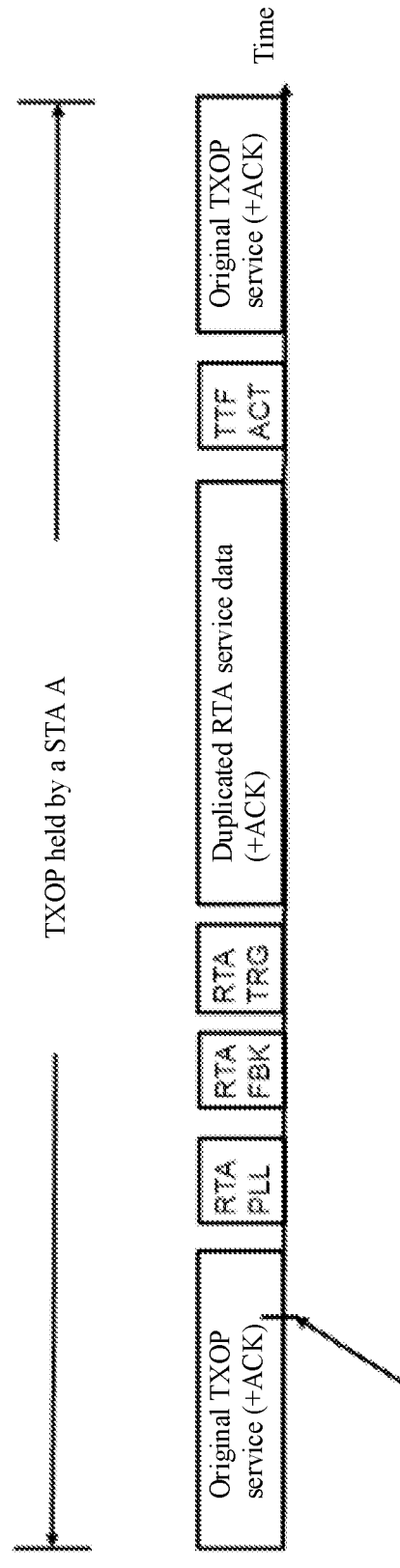
FIG. 19 is a schematic diagram of RTA service transmission conducted over a secondary link at a high priority according to an embodiment of the present disclosure.

FIG. 19 is a schematic diagram of RTA service transmission conducted over a secondary link at a high priority according to an embodiment of the present disclosure. As shown in FIG. 19, in an example, in the secondary link, an STA A is a TXOP holder, and an STAB is an RTA service transmitting terminal. To transmit an RTA service at the high priority, an AP sequentially transmits an ACK and RTA PLL that are not cascaded, to acquire a TXOP control right; after receiving an RTA service request transmitted by the STA B by using RTA FBK, instructs, by using RTA TRG, the STA B to conduct RTA service transmission; and after transmission is completed, returns the control right to the STA A by using TTF ACT.

Figure 20:
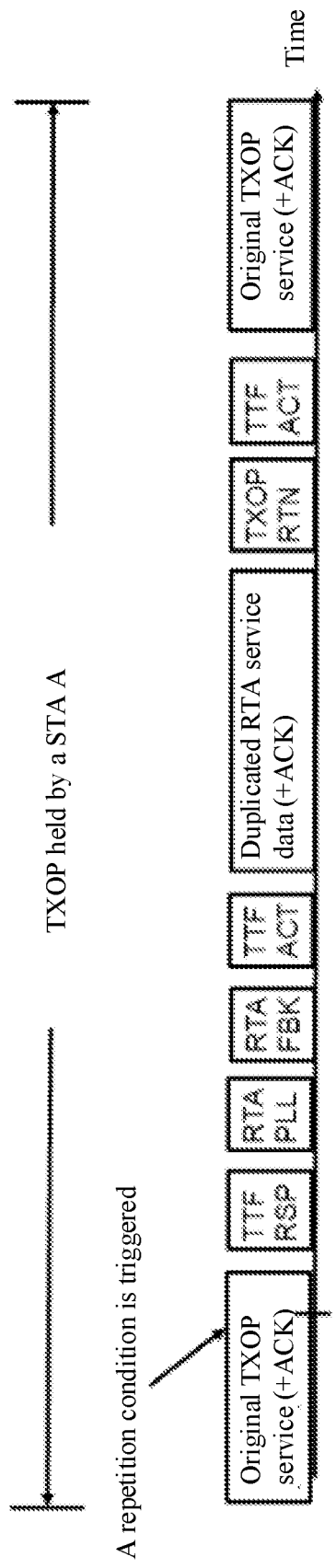
FIG. 20 is a schematic diagram of RTA service transmission conducted over a secondary link at a high priority according to an embodiment of the present disclosure.

FIG. 20 is a schematic diagram of RTA service transmission conducted over a secondary link at a high priority according to an embodiment of the present disclosure. As shown in FIG. 20, in an example, in the secondary link, an STA A is a TXOP holder, and an STAB is an RTA service transmitting terminal. To transmit an RTA service at the high priority, an AP sequentially transmits an ACK and RTA PLL that are not cascaded, to acquire a TXOP control right; the STA A makes a response to a request from an AP by using TTF RSP, and transfers the TXOP control right to the AP; after receiving an RTA service request transmitted by the STA B by using RTA FBK, the AP allocates the control right to the STA B by using TTF ACT; the STAB conducts RTA service transmission after acquiring the control right, and returns, after completing transmission, the control right to the AP by using TXOP RTN; and then the AP returns the control right to the STA A by using TTF ACT.

Figure 21:
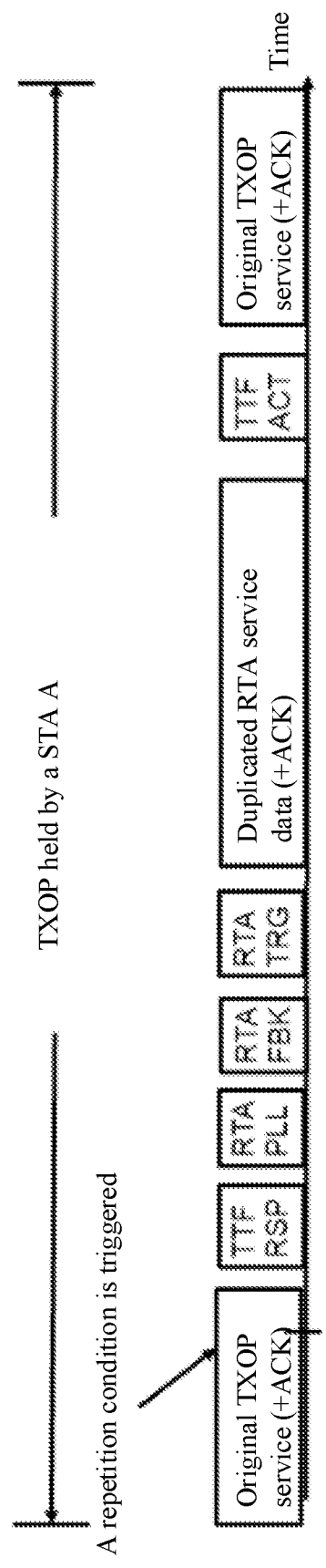
FIG. 21 is a schematic diagram of RTA service transmission conducted over a secondary link at a high priority according to an embodiment of the present disclosure.

FIG. 21 is a schematic diagram of RTA service transmission conducted over a secondary link at a high priority according to an embodiment of the present disclosure. As shown in FIG. 21, in an example, in the secondary link, an STA A is a TXOP holder, and an STAB is an RTA service transmitting terminal. To transmit an RTA service at the high priority, an AP sequentially transmits an ACK and RTA PLL that are not cascaded, to acquire a TXOP control right; the STA A responds to a request from an AP by using TTF RSP, and transfers the TXOP control right to the AP; after receiving an RTA service request transmitted by the STA B by using RTA FBK, the AP instructs, by using RTA TRG, the STA B to conduct RTA service transmission; and after transmission is completed, the AP returns the control right to the STA A by using TTF ACT.

Figure 22:
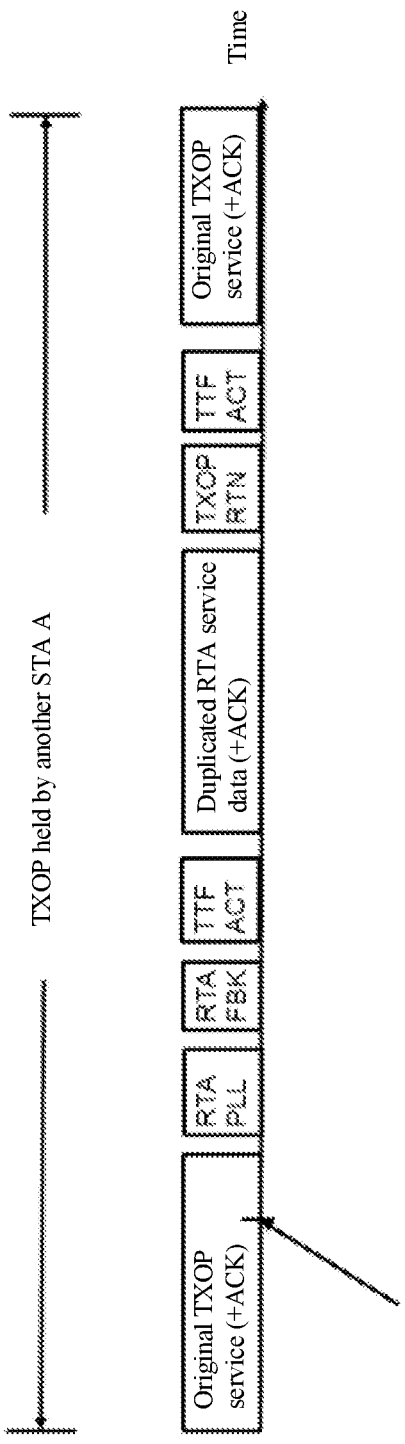
FIG. 22 is a schematic diagram of RTA service transmission conducted over a secondary link at a high priority according to an embodiment of the present disclosure.

FIG. 22 is a schematic diagram of RTA service transmission conducted over a secondary link at a high priority according to an embodiment of the present disclosure. As shown in FIG. 22, in an example, in the secondary link, an STA A is a TXOP holder, and an STAB is an RTA service transmitting terminal. To transmit an RTA service at the high priority, the STA A transfers a TXOP control right to an AP by providing an instruction in a packet; the AP transmits RTA PLL, and after receiving an RTA service request transmitted by the STA B by using RTA FBK, allocates the control right to the STA B by using TTF ACT; the STA B conducts RTA service transmission after acquiring the control right, and returns, after completing transmission, the control right to the AP by using TXOP RTN; and then the AP returns the control right to the STA A by using TTF ACT.

Figure 23:
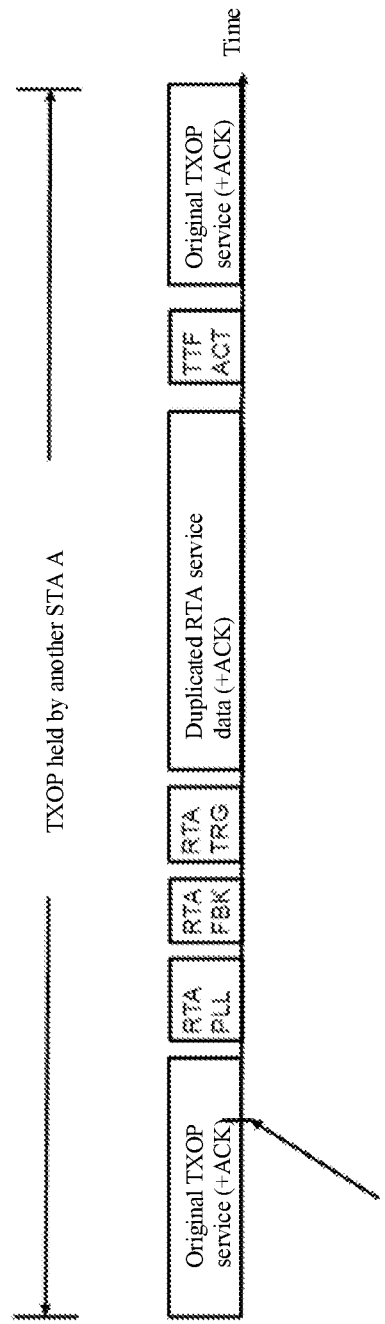
FIG. 23 is a schematic diagram of RTA service transmission conducted over a secondary link at a high priority according to an embodiment of the present disclosure.

FIG. 23 is a schematic diagram of RTA service transmission conducted over a secondary link at a high priority according to an embodiment of the present disclosure. As shown in FIG. 23, in an example, in the secondary link, an STA A is a TXOP holder, and an STAB is an RTA service transmitting terminal. To transmit an RTA service at the high priority, the STA A transfers a TXOP control right to an AP by providing an instruction in a packet; the AP transmits RTA PLL, and after receiving an RTA service request transmitted by the STA B by using RTA FBK, allocates the control right to the STA B by using TTF ACT; the STA B conducts RTA service transmission after acquiring the control right, and returns, after completing transmission, the control right to the AP by using TXOP RTN; and then the AP returns the control right to the STA A by using TTF ACT.

Figure 24:
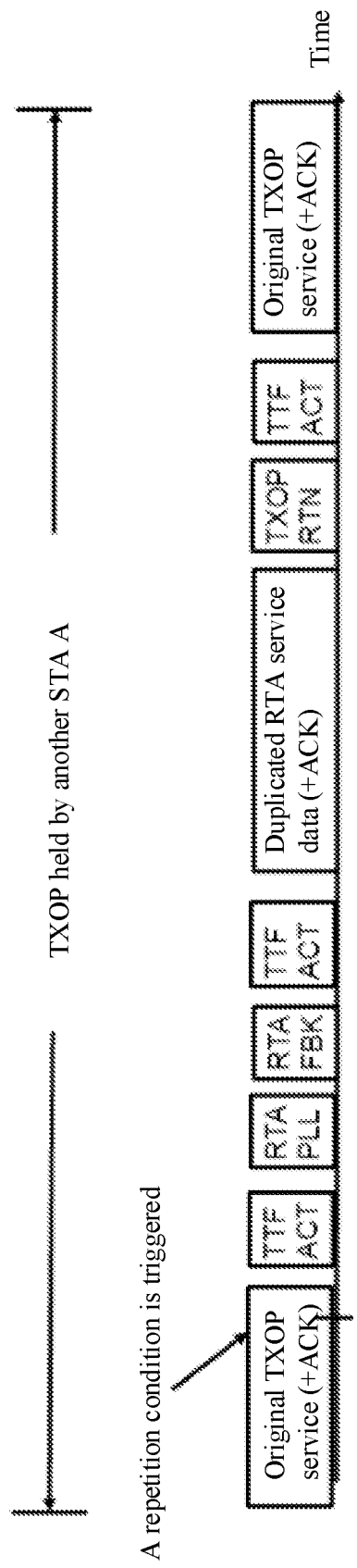
FIG. 24 is a schematic diagram of RTA service transmission conducted over a secondary link at a high priority according to an embodiment of the present disclosure.

FIG. 24 is a schematic diagram of RTA service transmission conducted over a secondary link at a high priority according to an embodiment of the present disclosure. As shown in FIG. 24, in an example, in the secondary link, an STA A is a TXOP holder, and an STAB is an RTA service transmitting terminal. To transmit an RTA service at the high priority, the STA A transfers a TXOP control right to an AP by transmitting TTF ACT; the AP transmits RTA PLL, and after receiving an RTA service request transmitted by the STA B by using RTA FBK, allocates the control right to the STA B by using TTF ACT; the STA B conducts RTA service transmission after acquiring the control right, and returns, after completing transmission, the control right to the AP by using TXOP RTN; and then the AP returns the control right to the STA A by using TTF ACT.

Figure 25:
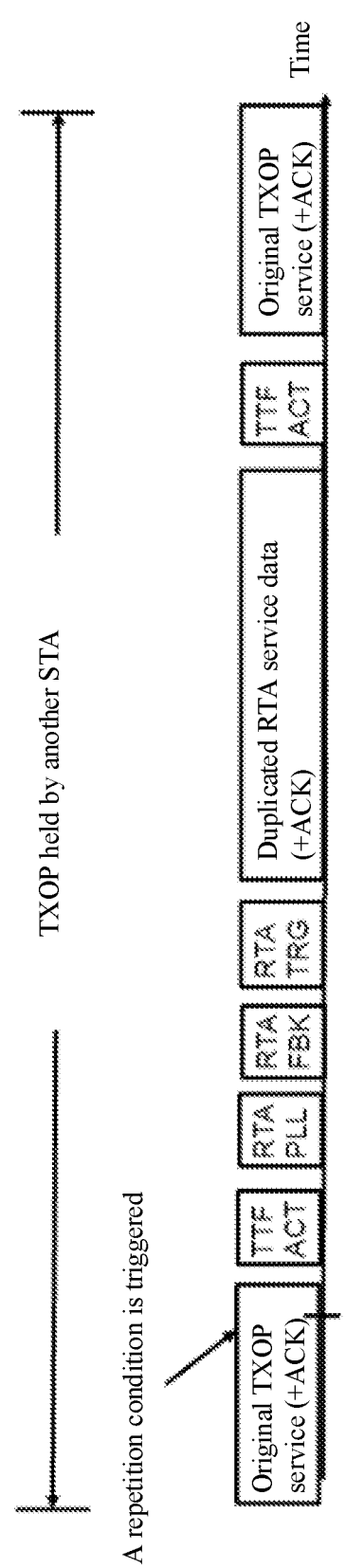
FIG. 25 is a schematic diagram of RTA service transmission conducted over a secondary link at a high priority according to an embodiment of the present disclosure.

FIG. 25 is a schematic diagram of RTA service transmission conducted over a secondary link at a high priority according to an embodiment of the present disclosure. As shown in FIG. 25, in an example, in the secondary link, an STA A is a TXOP holder, and an STAB is an RTA service transmitting terminal. To transmit an RTA service at the high priority, the STA A transfers a TXOP control right to an AP by transmitting TTF ACT; the AP transmits RTA PLL, and after receiving an RTA service request transmitted by the STA B by using RTA FBK, instructs, by using RTA TRG, the STA B to conduct RTA service transmission; and after transmission is completed, the AP returns the control right to the STA A by using TTF ACT.

In a possible implementation, the transmitting the duplicated RTA service over the secondary link at the high priority by using a TXOP holder may further include: adding a packet duration limit to the secondary link. In an example, to allow the RTA service data to be transmitted over the secondary link in time, duration of packets normally transmitted over the secondary link should not be excessively long, to avoid impact on timeliness of the RTA service data transmission. A length of the packet duration limit is not limited, and can be flexibly selected depending on an actual case. A manner of adding the packet duration limit to the secondary link is not limited. In an example, the packet duration limit may be indicated to all STAs in a beacon or another broadcast packet. For an STA that does not support the packet duration limit, a TXOP limit may further be considered.

In a possible implementation, the transmitting the duplicated RTA service over the secondary link at the high priority by using a TXOP holder may further include: adding a TXOP limit to the secondary link. The TXOP limit may be used as a progressive limit, and added on the basis of the packet duration limit, or may be used as a limit in parallel with the packet duration limit, and added in parallel with the packet time limit, regardless of the packet time limit. For the TXOP limit, a limit on TXOP duration may be considered. The TXOP duration is limited to a small interval, such that a duplicated packet in the secondary link cannot be congested by packets left by the STA for a long time. A length of the TXOP duration limit is not specifically limited, and can be flexibly selected depending on an actual case. For a specific manner of the TXOP limit, there may be multiple cases. In an example, a shorter TXOP limit may be set for an STA that does not support a packet duration limit, and a longer TXOP limit is set for an STA that supports a packet duration limit. The shorter and longer TXOP limits herein are relative comparison amounts, and values of the TXOP limits are not limited. For the implementation of the limits in the foregoing example, there may also be multiple cases. In one example, this implementation may be: for all STAs, using an old format to transmit shorter TXOP limit information; and for an advanced STA, using a new format to transmit longer TXOP limit information, where the advanced STA sets a TXOP limit by using a new format. In an example, this implementation may alternatively be: adding an additional TXOP limit information field to one control frame. An advanced STA sets a TXOP limit by using the additional TXOP limit information field.

In a possible implementation, in addition to applying the frames in all the foregoing examples to implement a series of processes such as transfer of a TXOP control right, other frame forms may also be used for indication. In an example, all TXOP transmission instructions may be set to be TTF ACT, but different optional information is indicated in a subframe of TTF ACT. In other words, whether a type of the TTF ACT subframe is corresponding to transfer of a TXOP control right, providing of a TXOP response, returning of a TXOP control right, or requesting of a TXOP control right is indicated in a field of the TTF ACT subframe. In an example, TTF ACT can indicate a TXOP response, and may be followed by a response frame, to ensure all operations of a process related to the transfer of the TXOP control right.

In this way, when the repetition condition is triggered, the RTA service is transmitted over the secondary link at the high priority in any form in the foregoing embodiments, and a transmission time of the RTA service may be shortened as much as possible. This increases a transmission speed of the RTA data, improves an RTA delay in a wireless local area network, and improves transmission reliability.

Figure 26:
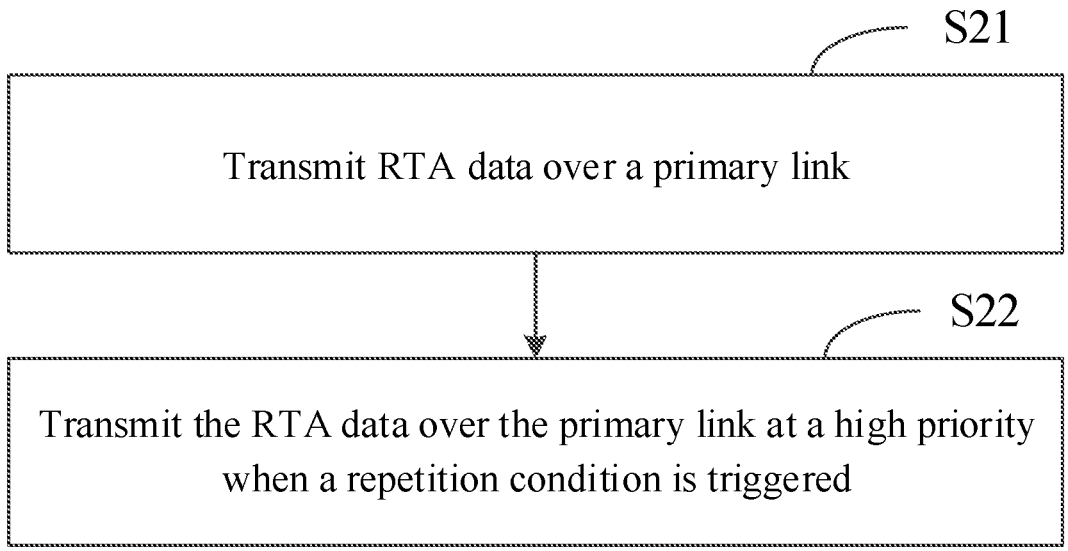
FIG. 26 is a flowchart of a method for multi-link data transmission according to another embodiment of the present disclosure.

FIG. 26 is a flowchart of a method for multi-link data transmission according to another embodiment of the present disclosure. As shown in FIG. 26, the method may include the following steps:

S21. Transmitting RTA data over a primary link.

S22. Transmitting the RTA data over the primary link at a high priority when a repetition condition is triggered.

A manner of triggering the repetition condition is not limited, and the repetition condition may be triggered unconditionally. In other words, the repetition condition can be directly triggered in any case. In this case, the RTA data can be transmitted over the primary link at the high priority. Alternatively, the repetition condition may be triggered in some specific conditions, and these specific conditions may be set depending on actual cases. In a possible implementation, the repetition condition may include: transmission of the RTA data over the primary link is not completed within a time threshold. That transmission of the RTA data is not completed may be that an acknowledgement frame (ACK) or a block ACK frame transmitted by a receiving terminal is not received. A value of the time threshold is not limited, and may vary with trigger of the repetition condition. The time threshold has different values. This is not limited herein. A manner in which the transmission of the RTA data is not completed within the time threshold is also not limited, and there may be multiple cases.

In a possible implementation, the repetition condition that the transmission of the RTA data over the primary link is not completed within the time threshold may include the following cases: the transmission of the RTA data fails; the primary link is congested due to interference; or the RTA data is congested by a transmission queue system of the primary link. In an example, that the transmission of the RTA data fails may refer to that the RTA data is transmitted but a receiving terminal fails to receive the RTA data. In an example, that the primary link is congested due to interference may refer to that the RTA data has not been transmitted and interference is detected. In an example, that the RTA data is congested by a transmission queue system of the primary link may refer to that the RTA data has not been transmitted and no interference is detected.

Regardless of a trigger form of the repetition condition, once the repetition condition is triggered, a MAC layer transmits the RTA service over a primary link at the high priority. For a specific manner of transmitting the RTA service over a primary link at a high priority, there may be multiple cases. In a possible implementation, the transmitting the RTA service over a primary link at a high priority may include the following step: transmitting the RTA data over the primary link at the high priority by using a TXOP holder.

In a possible implementation, the transmitting the RTA data over the primary link at the high priority by using a TXOP holder may include the following cases: transmitting the RTA data at the high priority when the primary link is in a channel idle state; or transmitting the RTA data over the primary link at the high priority when an RTA data transmitting terminal is consistent with the TXOP holder; or transmitting the RTA data over the primary link at the high priority when an RTA data transmitting terminal is inconsistent with the TXOP holder.

In a possible implementation, the transmitting the RTA data at the high priority when the primary link is in a channel idle state may include: adding, by the RTA data transmitting terminal, the RTA data to a waiting list of the primary link when the primary link is in the channel idle state, to immediately transmit the RTA data; or contending, by the RTA data transmitting terminal by using a contention window, for a channel over the primary link when the primary link is in the channel idle state, to transmit the RTA data. For specific understanding, reference may be made to FIG. 4 and FIG. 5 and related descriptions in the foregoing embodiments, and the secondary link in the foregoing embodiments may be replaced with the primary link. The contention window may be a small contention window. An initial value of a general contention window is randomly obtained within an upper-limit range (eg 1-8) of the general window. A small contention window is a contention window whose initial value is randomly obtained by using a relatively small upper limit (eg 1-4) smaller than the upper limit of the general window.

In a possible implementation, the transmitting the RTA data over the primary link at the high priority when an RTA data transmitting terminal is consistent with the TXOP holder may include: transmitting, by inserting the RTA data into a current TXOP queue, the RTA data over the primary link when the RTA data transmitting terminal is consistent with the TXOP holder. For specific understanding, reference may be made to FIG. 6 and related descriptions in the foregoing embodiments, and the secondary link in the foregoing embodiments may be replaced with the primary link.

In the primary link, there may be multiple different cases in which the RTA data transmitting terminal is inconsistent with the TXOP holder. In a possible implementation, the transmitting the RTA data over the primary link at the high priority when an RTA data transmitting terminal is inconsistent with the TXOP holder may include: transmitting the RTA data over the primary link at the high priority when the RTA data transmitting terminal is a wireless AP and the TXOP holder is a wireless access STA; or transmitting the RTA data over the primary link at the high priority when the RTA data transmitting terminal is an STA and the TXOP holder is an AP; or transmitting the RTA data over the primary link at the high priority when the RTA data transmitting terminal and the TXOP holder are different STAs.

Figure 27:
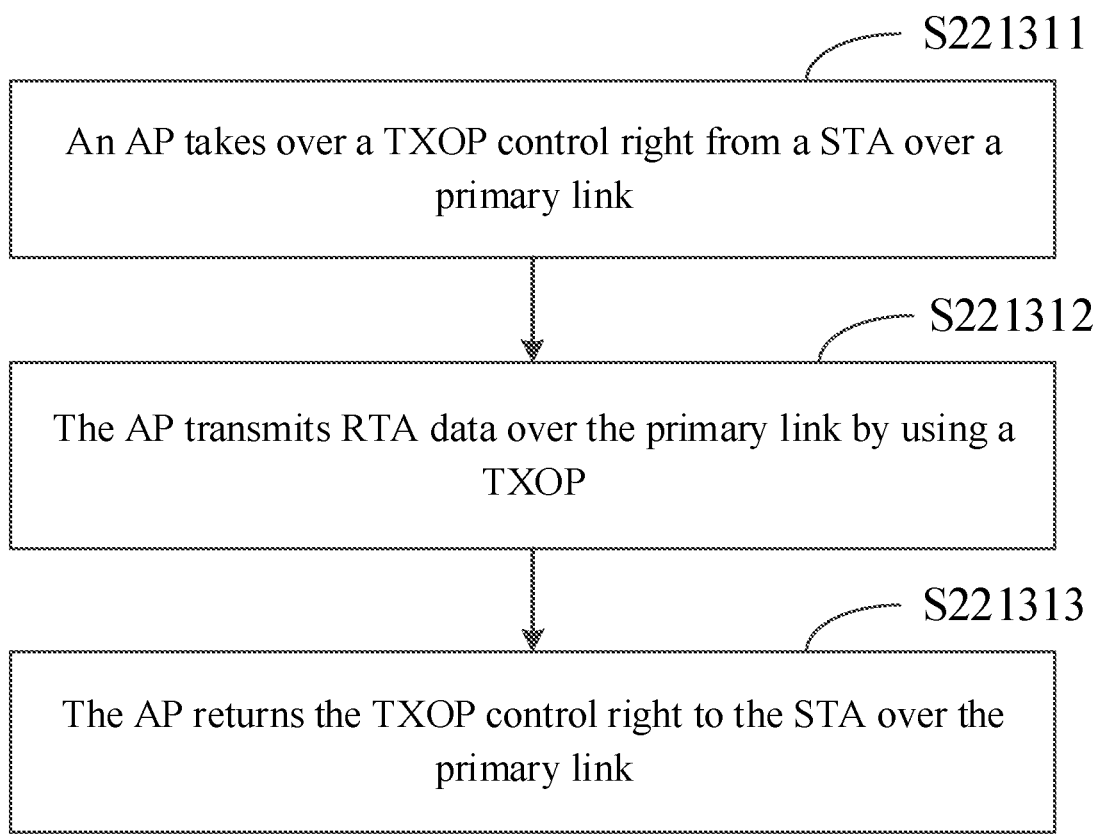
FIG. 27 is a flowchart of a method for multi-link data transmission according to another embodiment of the present disclosure.

FIG. 27 is a flowchart of a method for multi-link data transmission according to another embodiment of the present disclosure. As shown in FIG. 27, in a possible implementation, transmitting RTA data over a primary link at a high priority when an RTA data transmitting terminal is a wireless AP and a TXOP holder is a wireless access STA may include the following steps:

S221311. The AP takes over a TXOP control right from the STA over the primary link.

S221312. The AP transmits the RTA data over the primary link by using a TXOP.

S221313. The AP returns the TXOP control right to the STA over the primary link.

A specific implementation of the foregoing process is not specifically limited and can be selected depending on an actual case. For specific understanding, reference may be made to FIG. 8, FIG. 9, and FIG. 10 and related descriptions in the foregoing embodiments, and the secondary link in the foregoing embodiments may be replaced with the primary link.

In a possible implementation, transmitting the RTA data over the primary link at the high priority when the RTA data transmitting terminal is an STA and the TXOP holder is an AP may include: transmitting the RTA data over the primary link at the high priority when the RTA data transmitting terminal is an STA, the TXOP holder is an AP, and the STA is a receiving STA corresponding to the AP; or transmitting the RTA data over the primary link at the high priority when the RTA data transmitting terminal is an STA, the TXOP holder is an AP, and the STA is not a receiving STA corresponding to the AP.

In a possible implementation, the transmitting the RTA data over the primary link at the high priority when the RTA data transmitting terminal is an STA, the TXOP holder is an AP, and the STA is a receiving STA corresponding to the AP may include the following steps:

Transmitting, by the STA, an RTA data transmission request to the AP over the primary link by using an acknowledgement frame; and Transmitting, by the STA, the RTA data over the primary link with the assistance of the AP.

In a possible implementation, the transmitting the RTA data over the primary link at the high priority when the RTA data transmitting terminal is an STA, the TXOP holder is an AP, and the STA is not a receiving STA corresponding to the AP may include the following steps:

Periodically polling, by the AP, a specified STA or a non-specified STA other than the specified STA for an RTA data transmission request by using a UL-OFDMA trigger frame;

Under a condition that the STA as the RTA data transmitting terminal is the specified STA, transmitting the RTA data transmission request by using a specified RU, or under a condition that the STA as the RTA data transmitting terminal is the non-specified STA other than specified STA, transmitting the RTA data transmission request by using a random access resource unit (RA-RU); and Transmitting, by the STA as the RTA data transmitting terminal, the RTA data over the primary link with the assistance of the AP.

Regardless of whether the STA as the RTA data transmitting terminal is a receiving STA corresponding to the AP or not, the STA finally used as the RTA data transmitting terminal needs to transmit the RTA data with the assistance of the AP. In a possible implementation, the transmitting, by the STA, the RTA data over the primary link with the assistance of the AP may include the following steps:

Allocating, by the AP, the TXOP control right to the STA;

Transmitting, by the STA, the RTA data over the primary link; and

Returning, by the STA, the TXOP control right to the AP.

In a possible implementation, the transmitting, by the STA, the RTA data over the primary link with the assistance of the APP may include the following step: transmitting, by the STA, the RTA data in a UL-OFDMA format over the primary link based on configuration conducted by the AP. For specific understanding, reference may be made to related descriptions of transmitting the RTA service in the UL-OFDMA format in the foregoing embodiments and related descriptions of FIG. 11 and FIG. 14, and the secondary link in the foregoing embodiments may be replaced with the primary link.

Figure 28:
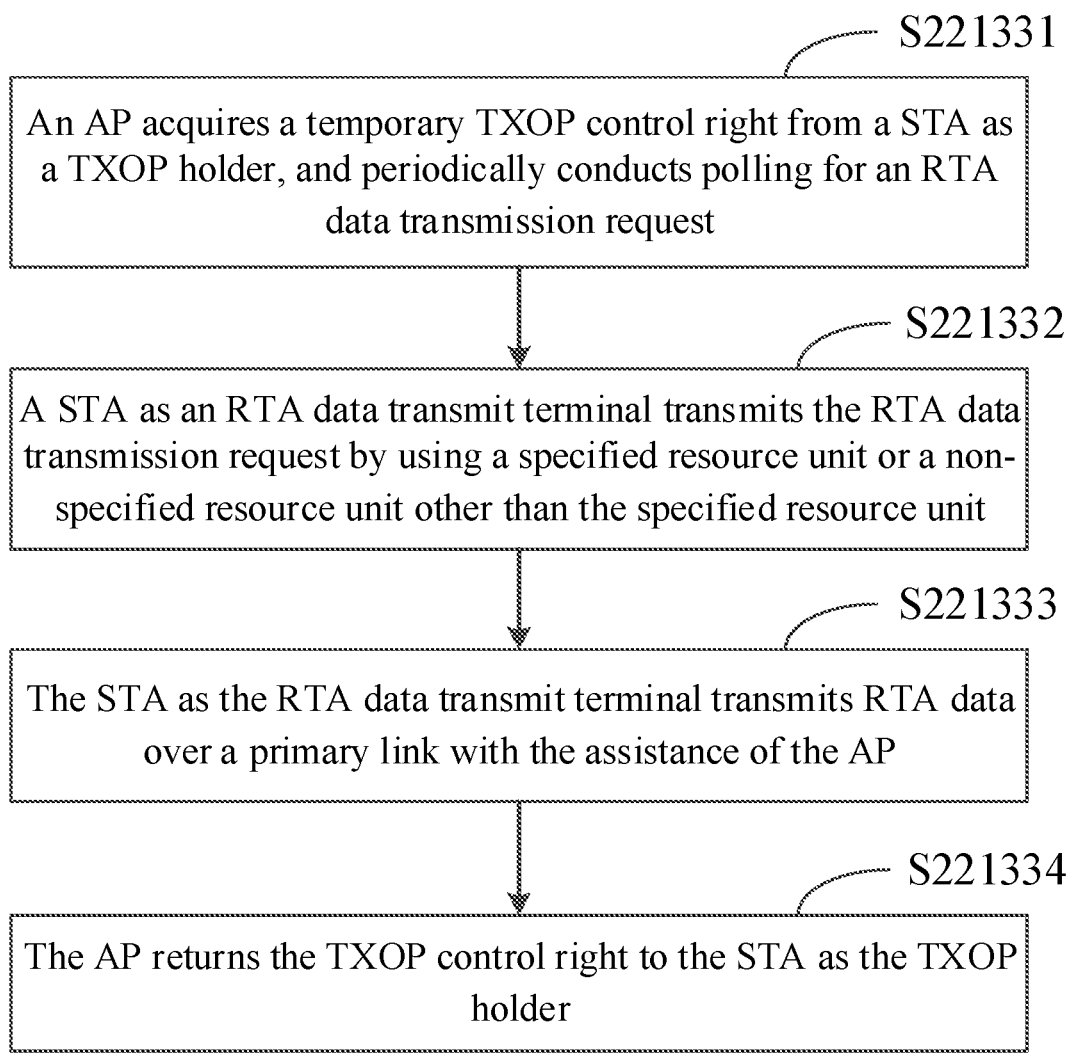
FIG. 28 is a flowchart of a method for multi-link data transmission according to another embodiment of the present disclosure.

FIG. 28 is a flowchart of a method for multi-link data transmission according to another embodiment of the present disclosure. As shown in FIG. 28, in a possible implementation, transmitting RTA data over a primary link at a high priority when an RTA data transmitting terminal and a TXOP holder are different STAs may include the following steps:

S221331. An AP acquires a temporary TXOP control right from an STA as a TXOP holder, and periodically conducts polling for an RTA data transmission request.

S221332. An STA as an RTA data transmitting terminal transmits the RTA data transmission request by using a specified resource unit or a non-specified resource unit other than the specified resource unit.

S221333. The STA as the RTA data transmitting terminal transmits RTA data over the primary link with the assistance of the AP.

S221334. The AP returns the TXOP control right to the STA as the TXOP holder.

In the foregoing process, a manner of transmitting, by the STA as the RTA data transmitting terminal, the RTA data with the assistance of the AP is the same as that in a case in which the RTA data transmitting terminal is an STA and the TXOP is an AP. To be specific, the STA may acquire the TXOP control right from the AP and then conduct RTA data transmission, or may not acquire the control right from the AP but directly conducts RTA data transmission based on configuration conducted by the AP. Therefore, details are not specifically described herein. The AP acquires the temporary TXOP control right from the STA as the TXOP holder, and periodically conducts polling for the RTA data transmission request. There may be multiple implementations.

In a possible implementation, step S221331 may include: acquiring, by the AP, the temporary TXOP control right from the STA as the TXOP holder, and periodically conducting polling for the RTA data transmission request by using a cascading trigger frame, the cascading trigger frame includes a cascade of an acknowledgement frame and a UL-OFDMA trigger frame, and the cascading trigger frame includes information about a request for the temporary TXOP control right; or acquiring, by the AP, the temporary TXOP control right from the STA as the TXOP holder, and periodically conducting polling for the RTA data transmission request by sequentially using an acknowledgement frame and a UL-OFDMA trigger frame, the acknowledgement frame includes information about a request for the temporary TXOP control right; or acquiring, by the AP, the temporary TXOP control right by receiving a TXOP transmission response TTF RSP transmitted by the STA as the TXOP holder, and periodically conducting polling for the RTA data transmission request by sequentially using an acknowledgement frame and a UL-OFDMA trigger frame, the acknowledgement frame includes information about a request for the temporary TXOP control right, and the TTF RSP includes information about a response to the request for the temporary TXOP control right; or acquiring, by the AP by using a TXOP transmission instruction frame or indication data, the temporary TXOP control right proactively released by the STA as the TXOP holder, and periodically conducting polling for the RTA data transmission request by transmitting a UL-OFDMA trigger frame. For specific understanding, reference may be made to related descriptions of step S123331 and FIG. 16 and FIG. 25 in the foregoing embodiments, and the secondary link in the foregoing embodiments may be replaced with the primary link.

In a possible implementation, the transmitting the RTA data over the primary link at the high priority by using a TXOP holder may further include: adding a packet duration limit to the primary link. In an example, to allow the RTA data to be transmitted over the primary link in time, duration of packets normally transmitted over the primary link should not be excessively long, to avoid impact on timeliness of the RTA data transmission. A length of the packet duration limit is not limited, and can be flexibly selected depending on an actual case. A manner of adding the packet duration limit to the primary link is not limited. In an example, the packet duration limit may be indicated to all STAs in a beacon or another broadcast packet. For an STA that does not support the packet duration limit, a TXOP limit may further be considered.

In a possible implementation, the transmitting the RTA data over the primary link at the high priority by using a TXOP holder further includes: adding a TXOP limit to the primary link. The TXOP limit may be used as a progressive limit, and added on the basis of the packet duration limit, or may be used as a limit in parallel with the packet duration limit, and added in parallel with the packet time limit, regardless of the packet time limit. For the TXOP limit, a limit on TXOP duration may be considered. The TXOP duration is limited to a small interval, such that a duplicated packet in the primary link cannot be congested by packets left by the STA for a long time. A length of the TXOP duration limit is not specifically limited, and can be flexibly selected depending on an actual case. For a specific manner of the TXOP limit, there may be multiple cases. In an example, a shorter TXOP limit may be set for an STA that does not support a packet duration limit, and a longer TXOP limit is set for an STA that supports a packet duration limit. The shorter and longer TXOP limits herein are relative comparison amounts, and values of the TXOP limits are not limited. For the implementation of the limits in the foregoing example, there may also be multiple cases. In one example, this implementation may be: for all STAs, using an old format to transmit shorter TXOP limit information; and for an advanced STA, using a new format to transmit longer TXOP limit information, where the advanced STA sets a TXOP limit by using a new format. In an example, this implementation may alternatively be: adding an additional TXOP limit information field to one control frame. An advanced STA sets a TXOP limit by using the additional TXOP limit information field.

In a possible implementation, in addition to applying the frames in all the foregoing examples to implement a series of processes such as transfer of a TXOP control right, other frame forms may also be used for indication. In an example, all TXOP transmission instructions may be set to be TTF ACT, but different optional information is indicated in a subframe of TTF ACT. In other words, whether a type of the TTF ACT subframe is corresponding to transfer of a TXOP control right, providing of a TXOP response, returning of a TXOP control right, or requesting of a TXOP control right is indicated in a field of the TTF ACT subframe. In an example, in addition to providing of a TXOP response, TTF ACT may also be corresponding to a response frame, to ensure all operations of a process related to the transfer of the TXOP control right.

In this way, when the repetition condition is triggered, the RTA data is transmitted over the primary link at the high priority in any form in the foregoing embodiments, and a transmission time of the RTA data may be shortened as much as possible. This increases a transmission speed of the RTA data, improves an RTA delay in a wireless local area network, and improves transmission reliability.

The foregoing two method embodiments may be further combined to form a new embodiment of the present disclosure. A method corresponding to the new embodiment includes: transmitting RTA data over a primary link; and transmitting the RTA data over both the primary link and a secondary link at a high priority when a repetition condition is triggered. For a specific process of transmitting the RTA data over the primary link at the high priority and a specific process of transmitting the RTA data over the secondary link at the high priority, please refer to the foregoing embodiments. Details are not repeated herein.

Figure 29:
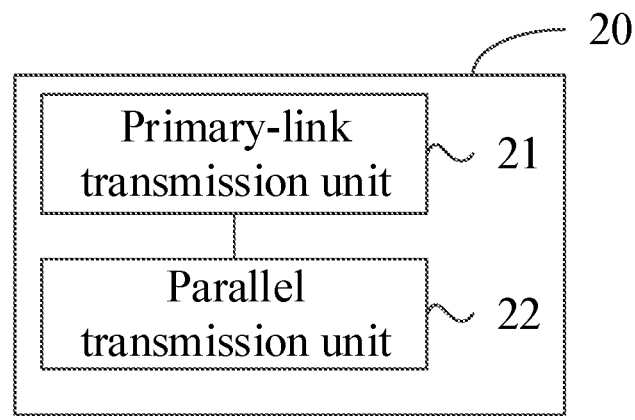
FIG. 29 is a block diagram of a multi-link data transmission apparatus according to an embodiment of the present disclosure.

FIG. 29 is a block diagram of a multi-link data transmission apparatus according to an embodiment of the present disclosure. As shown in FIG. 29, the apparatus 20 includes:

A primary-link transmission unit 21, configured to transmit RTA data over a primary link; and A parallel transmission unit 22, configured to transmit the RTA data at a high priority when a repetition condition is triggered.

Figure 30:
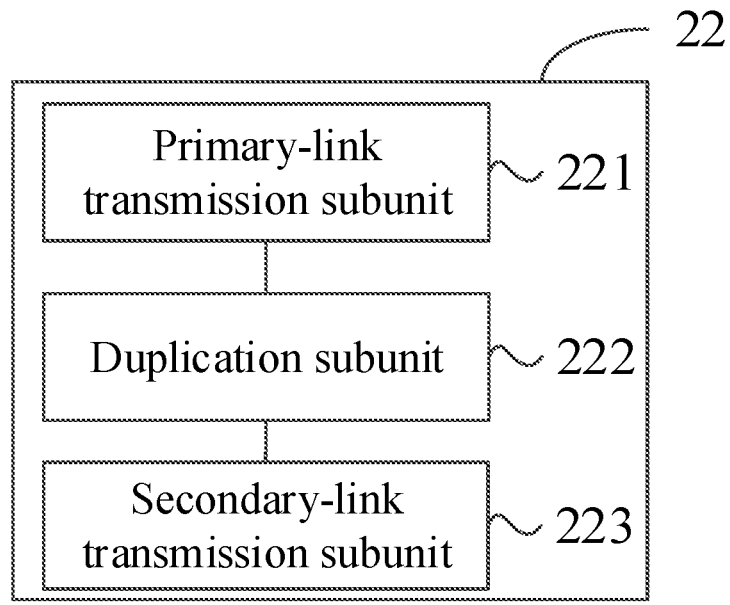
FIG. 30 is a block diagram of a multi-link data transmission apparatus according to an embodiment of the present disclosure.

FIG. 30 is a block diagram of a multi-link data transmission apparatus according to an embodiment of the present disclosure. As shown in the figure, in a possible implementation, a parallel transmission unit 22 is configured to transmit RTA data over a secondary link at a high priority when a repetition condition is triggered. The parallel transmission unit 22 may include:

A primary-link transmission subunit 221, configured to: when the repetition condition is triggered, continue to transmit the RTA data over a primary link;

A duplication subunit 222, configured to duplicate the RTA data; and

A secondary-link transmission subunit 223, configured to: transmit the duplicated RTA data over the secondary link at the high priority by using a TXOP holder.

In a possible implementation, the repetition condition may include: transmission of the RTA data over the primary link is not completed within a time threshold.

In a possible implementation, the repetition condition that the transmission of the RTA data over the primary link is not completed within the time threshold may include: the transmission of the RTA data fails; or the primary link is congested due to interference; or the RTA data is congested by a transmission queue system of the primary link.

In a possible implementation, the transmitting the duplicated RTA data over the secondary link at the high priority by using a TXOP holder may include: The secondary-link transmission subunit 223 transmits the RTA data at the high priority when the secondary link is in a channel idle state; the secondary-link transmission subunit 223 transmits the RTA data over the secondary link at the high priority when an RTA data transmitting terminal is consistent with the TXOP holder; or the secondary-link transmission subunit 223 transmits the RTA data over the secondary link at the high priority when an RTA data transmitting terminal is inconsistent with the TXOP holder.

In a possible implementation, the secondary-link transmission subunit 223 transmits the RTA data at the high priority when the secondary link is in the channel idle state may include: the secondary-link transmission subunit 223 adds the RTA data to a waiting list of the secondary link when the secondary link is in the channel idle state, to immediately transmit the RTA data; or the secondary-link transmission subunit 223 contends, by using a contention window, for a channel in the secondary link when the secondary link is in the channel idle state, to transmit the RTA data.

In a possible implementation, the secondary-link transmission subunit 223 transmits the RTA data over the secondary link at the high priority when the RTA data transmitting terminal is consistent with the TXOP holder may include: The secondary-link transmission subunit 223 transmits, by inserting the RTA data into a current TXOP queue, the RTA data over the secondary link when the RTA data transmitting terminal is consistent with the TXOP holder. The RTA data transmitting terminal in the present disclosure is the multi-link data transmission apparatus.

In a possible implementation, the secondary-link transmission subunit 223 transmits the RTA data over the secondary link at the high priority when the RTA data transmitting terminal is inconsistent with the TXOP holder may include: the secondary-link transmission subunit 223 transmits the RTA data over the secondary link at the high priority when the RTA data transmitting terminal is a wireless AP and the TXOP holder is a wireless access STA; the secondary-link transmission subunit 223 transmits the RTA data over the secondary link at the high priority when the RTA data transmitting terminal is an STA and the TXOP holder is an AP; or the secondary-link transmission subunit 223 transmits the RTA data over the secondary link at the high priority when the RTA data transmitting terminal and the TXOP holder are different STAs.

In a possible implementation, the secondary-link transmission subunit 223 transmits the RTA data over the secondary link at the high priority when the RTA data transmitting terminal is a wireless AP and the TXOP holder is a wireless access STA may include: the secondary-link transmission subunit 223 takes over a TXOP control right from the STA over the secondary link; the secondary-link transmission subunit 223 transmits the RTA data over the secondary link by using a TXOP; and the secondary-link transmission subunit 223 returns the TXOP control right to the STA over the secondary link.

In a possible implementation, the secondary-link transmission subunit 223 transmits the RTA data over the secondary link at the high priority when the RTA data transmitting terminal is an STA and the TXOP holder is an AP may include: the secondary-link transmission subunit 223 transmits the RTA data over the secondary link at the high priority when the RTA data transmitting terminal is an STA, the TXOP holder is an AP, and the STA is a receiving STA corresponding to the AP; or the secondary-link transmission subunit 223 transmits the RTA data over the secondary link at the high priority when the RTA data transmitting terminal is an STA, the TXOP holder is an AP, and the STA is not a receiving STA corresponding to the AP.

In a possible implementation, the secondary-link transmission subunit 223 transmits the RTA data over the secondary link at the high priority when the RTA data transmitting terminal is an STA, the TXOP holder is an AP, and the STA is a receiving STA corresponding to the AP may include: the secondary-link transmission subunit 223 transmits an RTA data transmission request to the AP over the secondary link by using an acknowledgement frame; and the secondary-link transmission subunit 223 transmits the RTA data over the secondary link with the assistance of the AP.

In a possible implementation, the secondary-link transmission subunit 223 transmits the RTA data over the secondary link at the high priority when the RTA data transmitting terminal is an STA, the TXOP holder is an AP, and the STA is not a receiving STA corresponding to the AP may include: after the AP periodically polls a specified STA or a non-specified STA other than the specified STA for an RTA data transmission request by using a UL-OFDMA trigger frame, under a condition that the STA as the RTA data transmitting terminal is the specified STA, the secondary-link transmission subunit 223 transmits the RTA data transmission request by using a specified resource unit, or under a condition that the STA as the RTA data transmitting terminal is the non-specified STA other than specified STA, the secondary-link transmission subunit 223 transmits the RTA data transmission request by using a random access resource unit; and the secondary-link transmission subunit 223 transmits the RTA data over the secondary link with the assistance of the AP.

In a possible implementation, the secondary-link transmission subunit 223 transmits the RTA data over the secondary link at the high priority when the RTA data transmitting terminal and the TXOP holder are different STAs may include: after the AP acquires a temporary TXOP control right from the STA as the TXOP holder, and periodically conducts polling for an RTA data transmission request, the secondary-link transmission subunit 223 of the STA as the RTA data transmitting terminal transmits the RTA data transmission request by using a specified resource unit or a non-specified resource unit other than the specified resource unit, and transmits the RTA data over the secondary link with the assistance of the AP, the AP further returns the TXOP control right to the STA as the TXOP holder after the secondary-link transmission subunit 223 transmits the RTA data.

In a possible implementation, the AP acquires the temporary TXOP control right from the STA as the TXOP holder, and periodically conducts polling for the RTA data transmission request may include: the AP acquires the temporary TXOP control right from the STA as the TXOP holder, and periodically conducts polling for the RTA data transmission request by using a cascading trigger frame, the cascading trigger frame includes a cascade of an acknowledgement frame and a UL-OFDMA trigger frame, and the cascading trigger frame includes information about a request for the temporary TXOP control right; or the AP acquires the temporary TXOP control right from the STA as the TXOP holder, and periodically conducts polling for the RTA data transmission request by sequentially using an acknowledgement frame and a UL-OFDMA trigger frame, the acknowledgement frame includes information about a request for the temporary TXOP control right; or the AP acquires the temporary TXOP control right by receiving a TXOP transmission response TTF RSP transmitted by the STA as the TXOP holder, and periodically conducts polling for the RTA data transmission request by sequentially using an acknowledgement frame and a UL-OFDMA trigger frame, the acknowledgement frame includes information about a request for the temporary TXOP control right, and the TTF RSP includes information about a response to the request for the temporary TXOP control right; or the AP acquires, by using a TXOP transmission instruction frame or indication data, the temporary TXOP control right released by the STA as the TXOP holder, and periodically conducts polling for the RTA data transmission request by transmitting a UL-OFDMA trigger frame.

In a possible implementation, the secondary-link transmission subunit 223 transmits the RTA data over the secondary link with the assistance of the AP may include: after the AP allocates the TXOP control right to the STA, the secondary-link transmission subunit 223 transmits the RTA data over the secondary link, and then returns the TXOP control right to the AP; or the secondary-link transmission subunit 223 transmits the RTA data over the secondary link with the assistance of the AP may include: the secondary-link transmission subunit 223 transmits the RTA data in a UL-OFDMA format over the secondary link based on configuration conducted by the AP.

In a possible implementation, the transmitting the duplicated RTA data over the secondary link at the high priority by using a TXOP holder may further include: adding a packet duration limit to the secondary link.

In a possible implementation, the transmitting the duplicated RTA data over the secondary link at the high priority by using a TXOP holder may further include: adding a TXOP limit to the secondary link.

Figure 31:
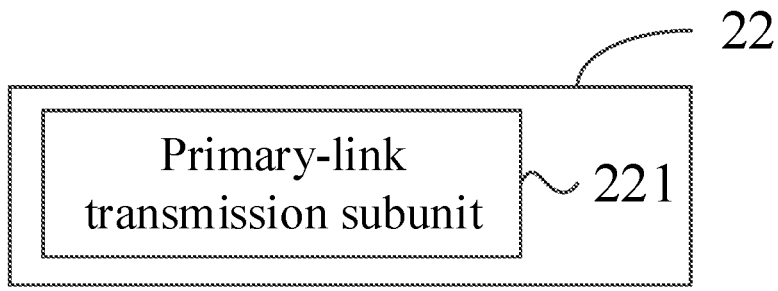
FIG. 31 is a block diagram of a multi-link data transmission apparatus according to another embodiment of the present disclosure.

FIG. 31 is a block diagram of a multi-link data transmission apparatus according to another embodiment of the present disclosure. As shown in FIG. 31, in a possible implementation, a parallel transmission unit 22 is configured to transmit RTA data over a primary link at a high priority when a repetition condition is triggered. The parallel transmission unit 22 may include:

A primary-link transmission subunit 221, configured to: when the repetition condition is triggered, transmit the RTA data over the primary link at the high priority by using a TXOP holder.

In a possible implementation, the repetition condition may include: transmission of the RTA data over the primary link is not completed within a time threshold.

In a possible implementation, the repetition condition that the transmission of the RTA data over the primary link is not completed within the time threshold may include: the transmission of the RTA data fails; or the primary link is congested due to interference; or the RTA data is congested by a transmission queue system of the primary link.

In a possible implementation, the transmitting the RTA data over the primary link at the high priority by using a TXOP holder may include: the primary-link transmission subunit 221 transmits the RTA data at the high priority when the primary link is in a channel idle state; the primary-link transmission subunit 221 transmits the RTA data over the primary link at the high priority when an RTA data transmitting terminal is consistent with the TXOP holder; or the primary-link transmission subunit 221 transmits the RTA data over the primary link at the high priority when an RTA data transmitting terminal is inconsistent with the TXOP holder.

In a possible implementation, the primary-link transmission subunit 221 transmits the RTA data at the high priority when the primary link is in the channel idle state may include: the primary-link transmission subunit 221 adds the RTA data to a waiting list of the secondary link when the primary link is in the channel idle state, to immediately transmit the RTA data; or the primary-link transmission subunit 221 contends, by using a contention window, for a channel in the primary link when the primary link is in the channel idle state, to transmit the RTA data.

In a possible implementation, the primary-link transmission subunit 221 transmits the RTA data over the primary link at the high priority when the RTA data transmitting terminal is consistent with the TXOP holder may include: the primary-link transmission subunit 221 transmits, by inserting the RTA data into a current TXOP queue, the RTA data over the primary link when the RTA data transmitting terminal is consistent with the TXOP holder.

In a possible implementation, the primary-link transmission subunit 221 transmits the RTA data over the primary link at the high priority when the RTA data transmitting terminal is inconsistent with the TXOP holder may include: the primary-link transmission subunit 221 transmits the RTA data over the primary link at the high priority when the RTA data transmitting terminal is a wireless AP and the TXOP holder is a wireless access STA; the primary-link transmission subunit 221 transmits the RTA data over the primary link at the high priority when the RTA data transmitting terminal is an STA and the TXOP holder is an AP; or the primary-link transmission subunit 221 transmits the RTA data over the primary link at the high priority when the RTA data transmitting terminal and the TXOP holder are different STAs.

In a possible implementation, the primary-link transmission subunit 221 transmits the RTA data over the primary link at the high priority when the RTA data transmitting terminal is a wireless AP and the TXOP holder is a wireless access STA may include: the primary-link transmission subunit 221 takes over a TXOP control right from the STA over the primary link; the primary-link transmission subunit 221 transmits the RTA data over the primary link by using a TXOP; and the primary-link transmission subunit 221 returns the TXOP control right to the STA over the primary link.

In a possible implementation, the primary-link transmission subunit 221 transmits the RTA data over the primary link at the high priority when the RTA data transmitting terminal is an STA and the TXOP holder is an AP may include: the primary-link transmission subunit 221 transmits the RTA data over the primary link at the high priority when the RTA data transmitting terminal is an STA, the TXOP holder is an AP, and the STA is a receiving STA corresponding to the AP; or the primary-link transmission subunit 221 transmits the RTA data over the primary link at the high priority when the RTA data transmitting terminal is an STA, the TXOP holder is an AP, and the STA is not a receiving STA corresponding to the AP.

In a possible implementation, the primary-link transmission subunit 221 transmits the RTA data over the primary link at the high priority when the RTA data transmitting terminal is an STA, the TXOP holder is an AP, and the STA is a receiving STA corresponding to the AP may include: The primary-link transmission subunit 221 transmits an RTA data transmission request to the AP over the primary link by using an acknowledgement frame; and the primary-link transmission subunit 221 transmits the RTA data over the primary link with the assistance of the AP.

In a possible implementation, the primary-link transmission subunit 221 transmits the RTA data over the primary link at the high priority when the RTA data transmitting terminal is an STA, the TXOP holder is an AP, and the STA is not a receiving STA corresponding to the AP may include: after the AP periodically polls a specified STA or a non-specified STA other than the specified STA for an RTA data transmission request by using a UL-OFDMA trigger frame, if the STA as the RTA data transmitting terminal is the specified STA, the primary-link transmission subunit 221 transmits the RTA data transmission request by using a specified resource unit, or if the STA as the RTA data transmitting terminal is the non-specified STA other than specified STA, the primary-link transmission subunit 221 transmits the RTA data transmission request by using a random access resource unit; and the primary-link transmission subunit 221 transmits the RTA data with the assistance of the AP.

In a possible implementation, the primary-link transmission subunit 221 transmits the RTA data over the primary link at the high priority when the RTA data transmitting terminal and the TXOP holder are different STAs may include: after the AP acquires a temporary TXOP control right from the STA as the TXOP holder, and periodically conducts polling for an RTA data transmission request, the primary-link transmission subunit 221 of the STA as the RTA data transmitting terminal transmits the RTA data transmission request by using a specified resource unit or a non-specified resource unit other than the specified resource unit, and transmits the RTA data over the primary link with the assistance of the AP, the AP further returns the TXOP control right to the STA as the TXOP holder after the primary-link transmission subunit 221 transmits the RTA data.

In a possible implementation, the AP acquires the temporary TXOP control right from the STA as the TXOP holder, and periodically conducts polling for the RTA data transmission request may include: the AP acquires the temporary TXOP control right from the STA as the TXOP holder, and periodically conducts polling for the RTA data transmission request by using a cascading trigger frame, the cascading trigger frame includes a cascade of an acknowledgement frame and a UL-OFDMA trigger frame, and the cascading trigger frame includes information about a request for the temporary TXOP control right; or the AP acquires the temporary TXOP control right from the STA as the TXOP holder, and periodically conducts polling for the RTA data transmission request by sequentially using an acknowledgement frame and a UL-OFDMA trigger frame, the acknowledgement frame includes information about a request for the temporary TXOP control right; or the AP acquires the temporary TXOP control right by receiving a TXOP transmission response TTF RSP transmitted by the STA as the TXOP holder, and periodically conducts polling for the RTA data transmission request by sequentially using an acknowledgement frame and a UL-OFDMA trigger frame, the acknowledgement frame includes information about a request for the temporary TXOP control right, and the TTF RSP includes information about a response to the request for the temporary TXOP control right; or the AP acquires, by using a TXOP transmission instruction frame or indication data, the temporary TXOP control right released by the STA as the TXOP holder, and periodically conducts polling for the RTA data transmission request by transmitting a UL-OFDMA trigger frame.

In a possible implementation, the primary-link transmission subunit 221 transmits the RTA data over the primary link with the assistance of the AP may include: after the AP allocates the TXOP control right to the STA, the primary-link transmission subunit 221 transmits the RTA data over the primary link, and then returns the TXOP control right to the AP; or the primary-link transmission subunit 221 transmits the RTA data over the primary link with the assistance of the AP may include: the primary-link transmission subunit 221 transmits the RTA data in a UL-OFDMA format over the primary link based on configuration conducted by the AP.

In a possible implementation, the transmitting the RTA data over the primary link at the high priority by using a TXOP holder may further include: adding a packet duration limit to the primary link.

In a possible implementation, the transmitting the RTA data over the primary link at the high priority by using a TXOP holder may further include: adding a TXOP limit to the primary link.

Figure 32:
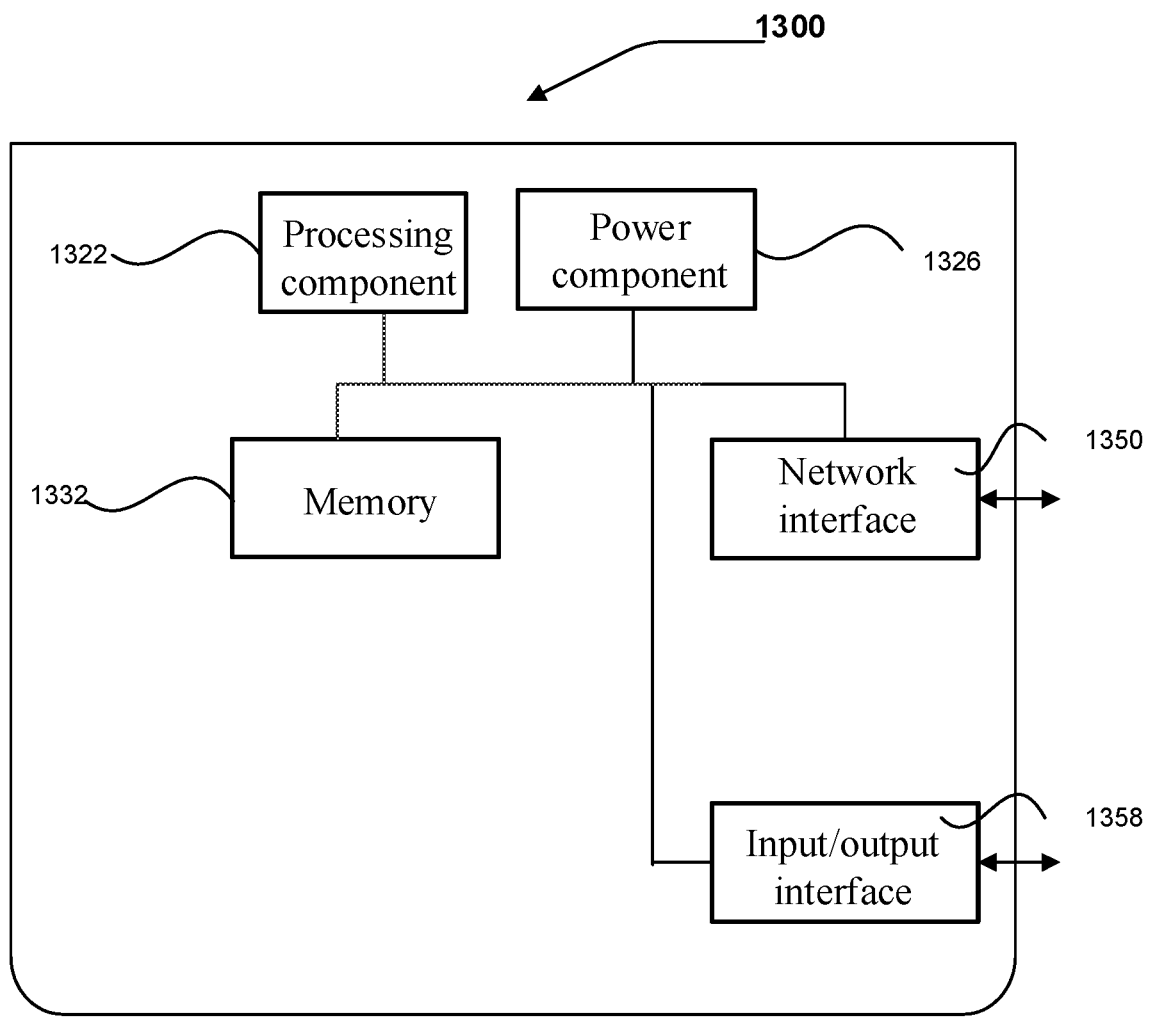
FIG. 32 is a block diagram of a multi-link data transmission apparatus according to an embodiment of the present disclosure.

FIG. 32 is a block diagram of a multi-link data transmission apparatus 1300 according to an exemplary embodiment of the present disclosure. For example, the apparatus 1300 may be provided as a server. Referring to FIG. 28, the apparatus 1300 includes a processing component 1322 that further includes one or more processors; and a memory resource represented by a memory 1332, configured to store instructions executable by the processing component 1322, such as an application program. The application program stored in the memory 1332 may include one or more modules each corresponding to a set of instructions. In addition, the processing component 1322 is configured to execute the instructions to implement the foregoing method.

The apparatus 1300 may further include a power supply component 1326 configured to conduct power management of the apparatus 1300, a wired or wireless network interface

1350 configured to connect the apparatus 1300 to a network, and an input/output (I/O) interface 1358. The apparatus 1300 can operate an operating system stored in the memory 1332, such as Windows Server™, Mac OS X™, Unix™, Linux™, FreeBSD™ and the like.

An exemplary embodiment further provides a non-transitory computer-readable storage medium, for example, a memory 1332 including computer program instructions. The computer program instructions may be executed by the processing component 1322 of the apparatus 1300 to implement the foregoing methods.

The present disclosure may be a system, a method, and/or a computer program product. The computer program product may include a computer-readable storage medium, and the computer-readable storage medium stores computer-readable program instructions for enabling a processor to implement various aspects of the present disclosure.

The computer-readable storage medium may be a tangible device that can hold and store instructions used by an instruction execution device. The computer-readable storage medium may be, for example, but not limited to, an electrical storage device, a magnetic storage device, an optical storage device, an electromagnetic storage device, a semiconductor storage device, or any suitable combination thereof. More specific examples (non-exhaustive list) of the computer-readable storage medium include: a portable computer disk, a hard disk, a random access memory (RAM), a read-only memory (ROM), an erasable programmable read-only memory (EPROM) (or flash memory), a static random access memory (SRAM), a portable compact disk read-only memory (CD-ROM), a digital versatile disk (DVD), a memory stick, a floppy disk, a mechanical encoding device, a punched card storing instructions, or a structure protruding in a groove and storing instructions, and any suitable combination thereof. The computer-readable storage medium used herein is not interpreted as a transient signal, such as a radio wave or another freely propagating electromagnetic wave, an electromagnetic wave propagating through a waveguide or another transmission medium (for example, a light pulse passing through an optical cable), or an electrical signal transmitted through a wire.

The computer-readable program instructions described herein can be downloaded from the computer-readable storage medium to various computing/processing devices, or downloaded to an external computer or an external storage device through a network, such as the Internet, a local area network, a wide area network, and/or a wireless network. The network may include a copper transmission cable, optical fiber transmission, wireless transmission, a router, a firewall, a switch, a gateway computer, and/or an edge server. A network adapter card or a network interface in each computing/processing device receives the computer-readable program instructions from the network, and forwards the computer-readable program instructions to store the computer-readable program instructions in a computer-readable storage medium of each computing/processing device.

The computer program instructions used to execute the operations in the present disclosure may be assembly instructions, instruction set architecture (ISA) instructions, machine instructions, machine-related instructions, microcode, firmware instructions, status setup data, or source code or object code written by using a programming language or any combination of a plurality of programming languages. The programming language includes object-oriented programming languages such as Smalltalk and C++ and conventional procedural programming languages such as the "C" language or similar programming languages. The computer-readable program instructions can be executed fully on a user computer, executed partially on a user computer, executed as an independent software packet, executed partially on a user computer and partially on a remote computer, or executed fully on a remote computer or a server. In a case in which a remote computer is involved, the remote computer may be connected to a user computer via any type of network, including a local area network (LAN) or a wide area network (WAN), or may be connected to an external computer (for example, connected via the Internet by using an Internet service provider). In some embodiments, an electronic circuit, such as a programmable logic circuit, a field programmable gate array (FPGA), or a programmable logic array (PLA), can be customized by using status information of a computer-readable program instruction. The electronic circuit can execute the computer-readable program instruction to implement various aspects of the present disclosure.

Various aspects of the present disclosure are described herein with reference to the flowcharts and/or the block diagrams of the methods, apparatuses (systems) and computer program products according to the embodiments of the present disclosure. It should be understood that each block of the flowcharts and/or block diagram and a combination of blocks in the flowcharts and/or block diagrams can be implemented by using the computer-readable program instructions.

These computer-readable program instructions can be provided to a processor of a general-purpose computer, a dedicated computer, or other programmable data processing apparatuses, to produce a machine, such that when executed by the processor of the computer or other programmable data processing apparatuses, these instructions produce an apparatus that implements functions/actions specified in one or more blocks in the flowcharts and/or block diagrams. Alternatively, these computer-readable program instructions may be stored in a computer-readable storage medium. These instructions enable a computer, a programmable data processing apparatus, and/or other devices to operate in a specific manner. Therefore, the computer-readable medium storing the instructions includes a manufactured product including instructions for implementing various aspects of the functions/actions specified in the one or more blocks in the flowcharts and/or block diagrams.

Alternatively, the computer-readable program instructions may be loaded onto a computer, another programmable data processing apparatus, or another device, such that a series of operation steps are executed on the computer, the another programmable data processing apparatus, or the another device to obtain a computer-implemented process. In this way, the functions/actions specified in the one or more blocks in the flowcharts and/or block diagrams can be implemented by using the instructions executed on the computer, the another programmable data processing apparatus, or the another device.

The flowcharts and block diagrams in the accompanying drawings illustrate system architectures, functions and operations that may be implemented by the system, method, and computer program product in the multiple embodiments of the present disclosure. Herein, each block in the flowcharts or block diagrams may represent a module, a program segment, or a part of an instruction, and the module, the program segment, or the part of the instruction includes one or more executable instructions used to implement specified logical functions. In some alternative implementations, functions indicated in the blocks may alternatively be implemented in an order different from the order indicated in the accompanying drawings. For example, two consecutive blocks can actually be executed in parallel basically, or sometimes can be executed in the reverse order, depending on the functions involved. It should also be noted that each block in the block diagrams and/or flowcharts and combinations of the block diagrams and/or the blocks in the flowcharts may be implemented by a dedicated hardware-based system for executing specified functions or operations, or may be implemented by a combination of dedicated hardware and computer instructions.

The embodiments of the present disclosure have been described above, and the above description is exemplary, not exhaustive, and is not limited to the disclosed embodiments. It is apparent to persons skilled in the art that many modifications and changes can be made without departing from the scope and spirit of the described embodiments. The terms used in the present disclosure are selected to best explain principles of the embodiments, actual applications, or improvements to technologies in the market, or to make other persons of ordinary skill in the art to understand the embodiments disclosed in the present disclosure.

What is claimed is:

1. A method for multi-link data transmission, comprising:
    establishing a real time application (RTA) transmission in a primary link and transmitting RTA data over the primary link; and
    transmitting the RTA data at a high priority in response to a repetition condition being triggered,
    wherein the repetition condition comprises: transmission of the RTA data over the primary link is not completed within a time threshold,
    wherein said transmitting the RTA data at a high priority comprises:
        transmitting the RTA data over a secondary link at the high priority,
        wherein said transmitting the RTA data over a secondary link at the high priority comprises:
            continuing to transmit the RTA data over the primary link;
            duplicating the RTA data; and
            transmitting the duplicated RTA data over the secondary link at the high priority by a transmission opportunity (TXOP) holder.

2. The method for multi-link data transmission according to claim 1, wherein said transmitting the RTA data at a high priority further comprises:
    transmitting the RTA data over the primary link at the high priority.

3. The method for multi-link data transmission according to claim 1, wherein
    said transmission of the RTA data over the primary link is not completed within the time threshold comprises:
    the transmission of the RTA data fails; or
    the primary link is congested due to interference; or
    the RTA data is congested by a transmission queue system of the primary link.

4. The method for multi-link data transmission according to claim 2, wherein
    said transmitting the RTA data over the primary link at the high priority comprises:
    transmitting the RTA data over the primary link at the high priority by a TXOP holder.

5. The method for multi-link data transmission according to claim 1, wherein said transmitting the duplicated RTA data over the secondary link at the high priority by a TXOP holder comprises:
    transmitting the RTA data at the high priority in response to the secondary link being in a channel idle state; or
    transmitting the RTA data over the secondary link at the high priority in response to an RTA data transmitting terminal being consistent with the TXOP holder; or
    transmitting the RTA data over the secondary link at the high priority in response to an RTA data transmitting terminal being inconsistent with the TXOP holder.

6. The method for multi-link data transmission according to claim 5, wherein said transmitting the RTA data at the high priority in response to the secondary link being in a channel idle state comprises:
    adding, by the RTA data transmitting terminal, the RTA data to a waiting list of the secondary link in response to the secondary link being in the channel idle state, to immediately transmit the RTA data, or contending, by the RTA data transmitting terminal by using a contention window, for a channel in the secondary link in response to the secondary link being in the channel idle state, to transmit the RTA data; or
    said transmitting the RTA data over the secondary link at the high priority in response to an RTA data transmitting terminal being consistent with the TXOP holder comprises:
    transmitting, by inserting the RTA data into a current TXOP queue, the RTA data over the secondary link in response to the RTA data transmitting terminal being consistent with the TXOP holder.

7. The method for multi-link data transmission according to claim 5, wherein said transmitting the RTA data over the secondary link at the high priority in response to an RTA data transmitting terminal being inconsistent with the TXOP holder comprises:
    transmitting the RTA data over the secondary link at the high priority based on that the RTA data transmitting terminal is a wireless access point (AP) and the TXOP holder is a wireless access station (STA); or transmitting the RTA data over the secondary link at the high priority based on that the RTA data transmitting terminal is an STA and the TXOP holder is an AP; or transmitting the RTA data over the secondary link at the high priority based on that the RTA data transmitting terminal and the TXOP holder are different STA.

8. The method for multi-link data transmission according to claim 7, wherein said transmitting the RTA data over the secondary link at the high priority based on that the RTA data transmitting terminal is a wireless AP and the TXOP holder is a wireless access STA comprises:
    taking over, by the AP, a TXOP control right from the STA over the secondary link;
    transmitting, by the AP, the RTA data over the secondary link by using a TXOP; and
    returning, by the AP, the TXOP control right to the STA over the secondary link.

9. The method for multi-link data transmission according to claim 7, wherein said transmitting the RTA data over the secondary link at the high priority based on that the RTA data transmitting terminal is an STA and the TXOP holder is an AP comprises:
    transmitting the RTA data over the secondary link at the high priority based on that the RTA data transmitting terminal is an STA, the TXOP holder is an AP, and the STA is a receiving STA corresponding to the AP; or
    transmitting the RTA data over the secondary link at the high priority based on that the RTA data transmitting terminal is an STA, the TXOP holder is an AP, and the STA is not a receiving STA corresponding to the AP.

10. The method for multi-link data transmission according to claim 9, wherein said transmitting the RTA data over the secondary link at the high priority based on that the RTA data transmitting terminal is an STA, the TXOP holder is an AP, and the STA is a receiving STA corresponding to the AP comprises:
 transmitting, by the STA, an RTA data transmission request to the AP over the secondary link by using an acknowledgement frame; and
 transmitting, by the STA, the RTA data over the secondary link with assistance of the AP; or
 said transmitting the RTA data over the secondary link at the high priority based on that the RTA data transmitting terminal is an STA, the TXOP holder is an AP, and the STA is not a receiving STA corresponding to the AP comprises:
 periodically polling, by the AP, a specified STA or a non-specified STA other than the specified STA for an RTA data transmission request by using an uplink orthogonal frequency division multiple access (UL-OFDMA) trigger frame;
 based on that the STA as the RTA data transmitting terminal is the specified STA, transmitting the RTA data transmission request by using a specified resource unit, or based on that the STA as the RTA data transmitting terminal is the non-specified STA other than the specified STA, transmitting the RTA data transmission request by using a random access resource unit; and
 transmitting, by the STA as the RTA data transmitting terminal, the RTA data over the secondary link with assistance of the AP.

11. The method for multi-link data transmission according to claim 7, wherein said transmitting the RTA data over the secondary link at the high priority based on that the RTA data transmitting terminal and the TXOP holder are different STAs comprises:
 acquiring, by the AP, a temporary TXOP control right from the STA as the TXOP holder, and periodically conducting polling for an RTA data transmission request;
 transmitting, by the STA as the RTA data transmitting terminal, the RTA data transmission request by using a specified resource unit or a non-specified resource unit other than the specified resource unit;
 transmitting, by the STA as the RTA data transmitting terminal, the RTA data over the secondary link with assistance of the AP; and
 returning, by the AP, the TXOP control right to the STA as the TXOP holder.

12. The method for multi-link data transmission according to claim 11, wherein said acquiring, by the AP, a temporary TXOP control right from the STA as the TXOP holder, and periodically conducting polling for an RTA data transmission request comprises:
 acquiring, by the AP, the temporary TXOP control right from the STA as the TXOP holder, and periodically conducting polling for the RTA data transmission request by using a cascading trigger frame, wherein the cascading trigger frame comprises a cascade of an acknowledgement frame and a UL-OFDMA trigger frame, and the cascading trigger frame comprises information about a request for the temporary TXOP control right; or
 acquiring, by the AP, the temporary TXOP control right from the STA as the TXOP holder, and periodically conducting polling for the RTA data transmission request by sequentially using an acknowledgement frame and a UL-OFDMA trigger frame, wherein the acknowledgement frame comprises information about a request for the temporary TXOP control right; or
 acquiring, by the AP, the temporary TXOP control right by receiving a TXOP transmission response TTF RSP transmitted by the STA as the TXOP holder, and periodically conducting polling for the RTA data transmission request by sequentially using an acknowledgement frame and a UL-OFDMA trigger frame, wherein the acknowledgement frame comprises information about a request for the temporary TXOP control right, and the TTF RSP comprises information about a response to the request for the temporary TXOP control right; or
 acquiring, by the AP by using a TXOP transmission instruction frame or indication data, the temporary TXOP control right released by the STA as the TXOP holder, and periodically conducting polling for the RTA data transmission request by transmitting a UL-OFDMA trigger frame.

13. The method for multi-link data transmission according to claim 11, wherein said transmitting, by the STA, the RTA data over the secondary link with assistance of the AP comprises:
 allocating, by the AP, the TXOP control right to the STA;
 transmitting, by the STA, the RTA data over the secondary link; and
 returning, by the STA, the TXOP control right to the AP; or
 said transmitting, by the STA, the RTA data over the secondary link with assistance of the AP comprises:
 transmitting, by the STA, the RTA data in a UL-OFDMA format over the secondary link based on configuration conducted by the AP.

14. The method for multi-link data transmission according to claim 5, wherein said transmitting the duplicated RTA data over the secondary link at the high priority by using a TXOP holder further comprises: adding a packet duration limit to the secondary link; and/or adding a TXOP limit to the secondary link.

15. A multi-link data transmission apparatus, comprising:
 a memory; and
 at least one processor coupled to the memory and configured to:
 establish a real time application (RTA) transmission in a primary link and transmit RTA data over the primary link; and
 transmit the RTA data at a high priority in response to a repetition condition being triggered,
 wherein the repetition condition comprises: transmission of the RTA data over the primary link is not completed within a time threshold,
 wherein the processor is configured to:
 transmit the RTA data over a secondary link at the high priority,
 wherein said transmit the RTA data over a secondary link at the high priority comprises:
  in response to the repetition condition being triggered, continue to transmit the RTA data over the primary link;
  duplicate the RTA data; and
  transmit the duplicated RTA data over the secondary link at the high priority by a transmission opportunity (TXOP) holder.

16. The multi-link data transmission apparatus according to claim 15, wherein the at least one processor is further configured to:

transmit the RTA data over the primary link at the high priority in response to the repetition condition being triggered.

17. The multi-link data transmission apparatus according to claim 15, wherein
said transmission of the RTA data over the primary link is not completed within the time threshold comprises:
the transmission of the RTA data fails;
the primary link is congested due to interference; or
the RTA data is congested by a transmission queue system of the primary link.

18. The multi-link data transmission apparatus according to claim 15, wherein the at least one processor is further configured to:
transmit the RTA data at the high priority in response to the secondary link being in a channel idle state, transmit the RTA data over the secondary link at the high priority in response to an RTA data transmitting terminal being consistent with the TXOP holder, or transmit the RTA data over the secondary link at the high priority in response to an RTA data transmitting terminal being inconsistent with the TXOP holder.

19. The multi-link data transmission apparatus according to claim 18, wherein the at least one processor is further configured to:
add the RTA data to a waiting list of the secondary link in response to the secondary link being in the channel idle state, to immediately transmit the RTA data, or contend, by using a contention window, for a channel in the secondary link in response to the secondary link being in the channel idle state, to transmit the RTA data; or
transmit, by inserting the RTA data into a current TXOP queue, the RTA data over the secondary link in response to the RTA data transmitting terminal being consistent with the TXOP holder.

20. The multi-link data transmission apparatus according to claim 18, wherein the at least one processor is further configured to:
transmit the RTA data over the secondary link at the high priority based on that the RTA data transmitting terminal is a wireless access point (AP) and the TXOP holder is a wireless access station (STA), or transmit the RTA data over the secondary link at the high priority based on that the RTA data transmitting terminal is an STA and the TXOP holder is an AP, or transmit the RTA data over the secondary link at the high priority based on that the RTA data transmitting terminal and the TXOP holder are different STAs.

21. The multi-link data transmission apparatus according to claim 20, wherein the at least one processor is further configured to:
take over a TXOP control right from the STA over the secondary link;
transmit the RTA data over the secondary link by a TXOP; and
return the TXOP control right to the STA over the secondary link.

22. The multi-link data transmission apparatus according to claim 20, wherein the at least one processor is further configured to:
transmit the RTA data over the secondary link at the high priority based on that the RTA data transmitting terminal is an STA, the TXOP holder is an AP, and the STA is a receiving STA corresponding to the AP, or transmit the RTA data over the secondary link at the high priority based on that the RTA data transmitting terminal is an STA, the TXOP holder is an AP, and the STA is not a receiving STA corresponding to the AP.

23. The multi-link data transmission apparatus according to claim 22, wherein the at least one processor is further configured to:
transmit an RTA data transmission request to the AP over the secondary link by using an acknowledgement frame, and
transmit the RTA data over the secondary link with assistance of the AP; or
after the AP periodically polls a specified STA or a non-specified STA other than the specified STA for an RTA data transmission request by using an uplink orthogonal frequency division multiple access (UL-OFDMA) trigger frame, based on that the STA as the RTA data transmitting terminal is the specified STA, transmit the RTA data transmission request by a specified resource unit, or based on that the STA as the RTA data transmitting terminal is the non-specified STA other than specified STA, transmit the RTA data transmission request by a random access resource unit, and
transmit the RTA data over the secondary link with assistance of the AP.

24. The multi-link data transmission apparatus according to claim 20, wherein the at least one processor is further configured to:
after the AP acquires a temporary TXOP control right from the STA as the TXOP holder, and periodically conducts polling for an RTA data transmission request, transmit the RTA data transmission request by a specified resource unit or a non-specified resource unit other than the specified resource unit, and transmit the RTA data over the secondary link with assistance of the AP, and
the AP returns the TXOP control right to the STA as the TXOP holder after transmitting the RTA data.

25. The multi-link data transmission apparatus according to claim 24, wherein said AP acquires the temporary TXOP control right from the STA as the TXOP holder, and periodically conducts polling for the RTA data transmission request comprises:
the AP acquires the temporary TXOP control right from the STA as the TXOP holder, and periodically conducts polling for the RTA data transmission request by using a cascading trigger frame, wherein the cascading trigger frame comprises a cascade of an acknowledgement frame and a UL-OFDMA trigger frame, and the cascading trigger frame comprises information about a request for the temporary TXOP control right; or
the AP acquires the temporary TXOP control right from the STA as the TXOP holder, and periodically conducts polling for the RTA data transmission request by sequentially using an acknowledgement frame and a UL-OFDMA trigger frame, wherein the acknowledgement frame comprises information about a request for the temporary TXOP control right; or
the AP acquires the temporary TXOP control right by receiving a TXOP transmission response TTF RSP transmitted by the STA as the TXOP holder, and periodically conducts polling for the RTA data transmission request by sequentially using an acknowledgement frame and a UL-OFDMA trigger frame, wherein the acknowledgement frame comprises information about a request for the temporary TXOP control right, and the TTF RSP comprises information about a response to the request for the temporary TXOP control right; or the AP acquires, by using a TXOP transmission instruction frame or indication data, the temporary TXOP control right released by the STA as the TXOP holder, and periodically conducts polling for the RTA data transmission request by transmitting a UL-OFDMA trigger frame.

26. The multi-link data transmission apparatus according to claim 24, wherein the at least one processor is further configured to:
after the AP allocates the TXOP control right to the STA, transmit the RTA data over the secondary link, and then return the TXOP control right to the AP; or
transmit the RTA data in a UL-OFDMA format over the secondary link based on configuration conducted by the AP.

27. The multi-link data transmission apparatus according to claim 18, wherein the at least one processor is further configured to: add a packet duration limit to the secondary link, and/or add a TXOP limit to the secondary link.

28. A non-transitory computer-readable storage medium having computer program instructions stored thereon, wherein the computer program instructions, when executed by a processor, are configured to:
establish a real time application (RTA) transmission in a primary link and transmitting RTA data over the primary link; and
transmit the RTA data at a high priority in response to a repetition condition being triggered,
wherein the repetition condition comprises: transmission of the RTA data over the primary link is not completed within a time threshold,
wherein the processor is configured to:
transmit the RTA data over a secondary link at the high priority;
wherein said transmit the RTA data over a secondary link at the high priority comprises:
in response to the repetition condition being triggered, continue to transmit the RTA data over the primary link;
duplicate the RTA data; and
transmit the duplicated RTA data over the secondary link at the high priority by a transmission opportunity (TXOP) holder.

* * * * *